(12) United States Patent
Somaiya et al.

(10) Patent No.: US 10,282,060 B2
(45) Date of Patent: May 7, 2019

(54) SEAMLESS PAGINATION

(71) Applicant: PAYPAL, INC., San Jose, CA (US)

(72) Inventors: Manas Haribhai Somaiya, Sunnyvale, CA (US); Rabi Chakraborty, Sunnyvale, CA (US); Nirveek De, Mountain View, CA (US); Akshata Baliga, San Jose, CA (US); Sudeep Dasgupta, Cupertino, CA (US); Meenal Varshney, Cupertino, CA (US); Dennis Marshall, San Ramon, CA (US); Ganesh Gopalakrishnan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/478,678

(22) Filed: Apr. 4, 2017

(65) Prior Publication Data
US 2017/0205973 A1 Jul. 20, 2017

Related U.S. Application Data

(63) Continuation of application No. 14/201,000, filed on Mar. 7, 2014, now Pat. No. 9,613,161.
(Continued)

(51) Int. Cl.
*G06F 17/00* (2006.01)
*G06F 3/0482* (2013.01)
(Continued)

(52) U.S. Cl.
CPC .......... *G06F 3/0482* (2013.01); *G06F 3/0485* (2013.01); *G06F 17/30867* (2013.01); *G06F 17/30905* (2013.01)

(58) Field of Classification Search
CPC ......... G06F 17/30905; G06F 17/30867; G06F 17/30749; G06F 17/30761; G06F 15/0291
See application file for complete search history.

(56) References Cited

U.S. PATENT DOCUMENTS 8,326,835 B1 12/2012 Munter
2003/0122873 A1 7/2003 Dieberger et al.
(Continued)

FOREIGN PATENT DOCUMENTS

CN 102239491 A 11/2011
CN 102591969 A 7/2012
(Continued)

OTHER PUBLICATIONS

Australian Office Action, as issued in connection with Australian Application No. 2014315161, dated Oct. 6, 2016, 2 pgs.
(Continued)

*Primary Examiner* — Truong V Vo
(74) *Attorney, Agent, or Firm* — Maschoff Brennan

(57) ABSTRACT

A search engine determines a number of pages to present to a user based on one or more of a variety of factors. The search engine may send the search results to a client machine, which may present a subset of the results along with a pagination control in a scrollable interface. The pagination control may present the number of pages determined by the search engine. The search engine may also determine a number of search results to present prior to the presentation of non-scrollable user interface (UI) elements based on the same or different factors. After the amount of scrolling exceeds a threshold, a non-scrollable UI element may be displayed. Additional thresholds may exist, such that additional non-scrollable UI elements are added as the user continues to scroll.

20 Claims, 24 Drawing Sheets

Related U.S. Application Data

(60) Provisional application No. 61/915,634, filed on Dec. 13, 2013, provisional application No. 61/874,286, filed on Sep. 5, 2013.

(51) Int. Cl.
*G06F 17/30* (2006.01)
*G06F 3/0485* (2013.01)

(56) References Cited

U.S. PATENT DOCUMENTS

| | | |
|---|---|---|
| 2005/0240865 A1 | 10/2005 | Atkins et al. |
| 2007/0061332 A1 | 3/2007 | Ramer et al. |
| 2008/0079972 A1 | 4/2008 | Goodwin et al. |
| 2008/0148192 A1* | 6/2008 | Read ............... G06F 17/30864 715/854 |
| 2010/0077343 A1 | 3/2010 | Uhl et al. |
| 2010/0146012 A1 | 6/2010 | Beaudreau et al. |
| 2011/0263231 A1 | 10/2011 | Ceponkus et al. |
| 2012/0011430 A1 | 1/2012 | Parker et al. |
| 2012/0042279 A1 | 2/2012 | Naderi |
| 2012/0239490 A1 | 9/2012 | Friedl et al. |
| 2013/0275164 A1 | 10/2013 | Gruber et al. |
| 2014/0067623 A1 | 3/2014 | Abraham et al. |
| 2015/0066907 A1 | 3/2015 | Somaiya et al. |
| 2017/0185694 A1* | 6/2017 | Stasior ............. G06F 17/30905 |

FOREIGN PATENT DOCUMENTS

| | | |
|---|---|---|
| CN | 105518655 A | 4/2016 |
| JP | 2000339339 A | 12/2000 |
| JP | 2011122583 A | 6/2011 |

OTHER PUBLICATIONS

Canadian Office Action, as issued in connection with Canadian Application No. 2922743, dated Feb. 2, 2017, 3 pgs.
Chinese Office Action, as issued in connection with Chinese Application No. 201480048918.1, dated Jun. 28, 2017, 10 pgs.
Chinese Office Action, as issued in connection with Chinese Application No. 201480048918.1, dated May 8, 2018, 6 pgs.
European Search Report, as issued in connection with European Application No. 14842311.4, dated Mar. 29, 2017, 8 pgs.
Japanese Office Action, as issued in connection with Japanese Application No. 2016540390, dated Apr. 18, 2017, 10 pgs.
International Search Report and Written Opinion, as issued in connection with International Patent Application No. PCT/US2014/054126, dated Dec. 4, 2014, 10 pgs.
Ahuvia, Yogev, "Infinite Scrolling: Let's Get to the Bottom of This", Smashing Magazine, [Online]. Retrieved from the Internet: <URL:http://www.smashingmagazine.com/2013/05/03/infinite-scrolling-lets-get-to-the-bottom-of-this/>, May 3, 2013, 20 pgs.
Din, Mond Hadihaizil, "How to Create Infinite Scroll Pagination", [Online]. Retrieved from the Internet: <URL:http://code.tutsplus.com/tutorials/how-to-create-infinite-scroll-pagination—wp-24873>, Mar. 17, 2012, 10 pgs.
Schofield, Jack, "Google Tries to Save the Web from the Curse of infinite scrolling", [Online]. Retrieved from the Internet: <URL:http://www.zdnet.com/google-tries-to-save-the-web-from-the-curse-of-infinite-scrolling-7000026900/>, Feb. 28, 2014, 3 pgs.
Japanese Office Action, as issued in connection with Japanese Application No. 2016540390, dated Jan. 5, 2018, 6 pgs.

\* cited by examiner

SEAMLESS PAGINATION

This application is a continuation of U.S. patent application Ser. No. 14/201,000 filed Mar. 7, 2014, and issued as U.S. Pat. No. 9,613,161 on Apr. 4, 2017, which claims benefit of priority from U.S. Provisional Application No. 61/874,286, filed Sep. 5, 2013, and U.S. Provisional Application No. 61/915,634, filed Dec. 13, 2013, the contents of which are incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013-2014, All Rights Reserved.

TECHNICAL FIELD

The subject matter disclosed herein generally relates to the presenting of data. Specifically, the present disclosure addresses systems and methods for the seamless pagination of presented data.

BRIEF DESCRIPTION OF THE DRAWINGS

Some embodiments are illustrated by way of example and not limitation in the figures of the accompanying drawings.

DETAILED DESCRIPTION

Figure 1:
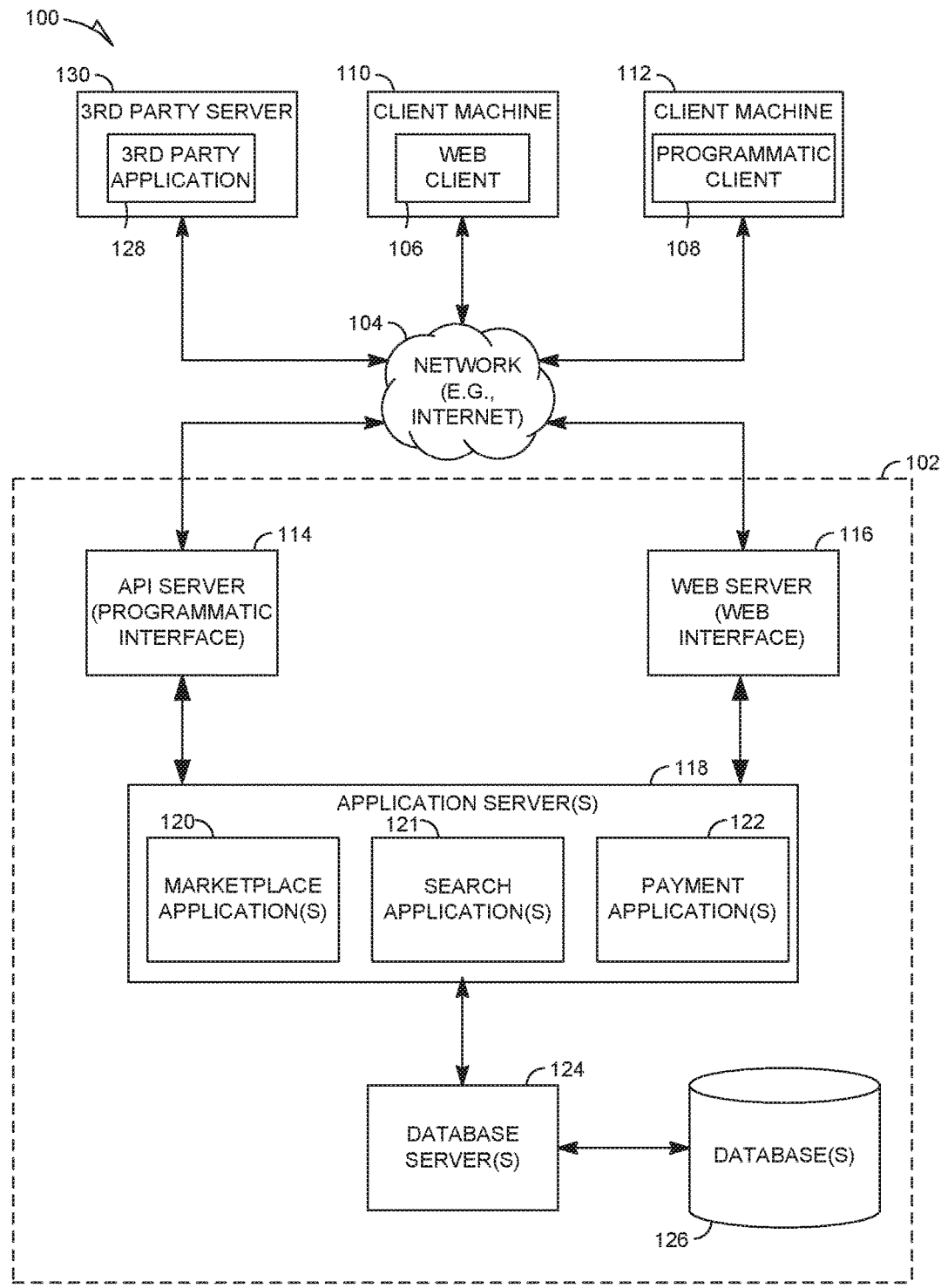
FIG. 1 is a network diagram illustrating a network environment, in accordance with an example embodiment, suitable for seamless pagination.

Example methods and systems are directed to seamless pagination and contextual refinement of a search during seamless pagination. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user may submit a search query (e.g., from a client machine) to a search engine (e.g., a search application running on an application server). The search engine may process the search query and generate a set of results. The search engine may determine a number of search results (or a number of pages of search results) to present to the user based on one or more of a variety of factors. Example factors include the number of search results viewed prior to performing an action, such as making a purchase, by other users that previously used the query; the number of search results viewed prior to performing an action, such as making a purchase, by this user after submitting previous queries; and so forth. The search engine may send the number of search results or the number of pages along with the search results to the client machine. The client machine may present a subset of the results along with a pagination control. The number of pages on the pagination control may be based on the number of search results (or pages of search results) determined by the search engine. The user may be permitted to view additional search results beyond the originally presented number of pages.

The results obtained from the search query may be presented in a scrollable interface. Refinement suggestions may also be presented in the scrollable interface. A refinement suggestion is a suggested modification to the search. In some example embodiments, the suggested modification refines the search by adding additional search terms or filters, reducing the number of results that match the search query. For example, an initial search may be for "shoes." A refinement suggestion may limit the search to shoes of a particular brand, in a particular price range, or being sold in a particular manner (e.g., fixed price or auction).

For example, each time the user presses the Page Down key or a down arrow on a scroll bar, the information presented in the UI may scroll, causing new information to be presented. The user may scroll in the opposite direction by pressing the Page Up key or an up arrow on the scroll bar. Each time the user scrolls down, new information is presented until all information has been presented. The information may include various types of data, including refinement suggestions and search results. When multiple types of data are presented together, all information of one type may be displayed before all information of another type is displayed. For example, one or two screens worth of refinement suggestions may be presented while many screens of results are presented. As a result, once the user has scrolled down beyond the end of the refinement suggestions, only search results are presented. A non-scrollable UI element may be used to present the refinement suggestions. For example, the refinement suggestions may be fixed in place on the screen and not move when the user scrolls. At the same time, results may be presented in a scrollable UI, so that when the user scrolls, new results are displayed while the refinement suggestions remain available.

Refinement suggestions may be initially presented in the scrollable interface, and the amount of scrolling performed detected. When the amount of scrolling exceeds a threshold, a non-scrollable UI element may be displayed. The user may scroll in the opposite direction. When the amount of scrolling falls below the threshold, the non-scrollable UI element may be removed. Additional thresholds may exist, such that additional non-scrollable UI elements are added as the user continues to scroll. The non-scrollable UI elements may provide the same functionality as the scrollable UI elements. The non-scrollable UI elements may be operable to present options available in the scrollable UI elements. For example, the scrollable elements may cover two screens. Two screens may be set as the threshold. The user may scroll past the second screen. Based on the user scrolling past the threshold, two UI elements may be presented, one corresponding to each screen that was scrolled past. Each of the UI elements may be operable (e.g., may be a button that responds to a mouse click) to display options that were displayed in the corresponding screen. Further thresholds may be set to alter the presented non-scrollable UI elements. For example, a button operable to display options may be displayed on the left-hand side after the user scrolls down one screen. The button may be removed and the options themselves presented after the user scrolls down a second screen. The options may be moved from the left of the screen to the center of the screen after the user scrolls down a third screen.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120, search applications 121, and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The search applications 121 may provide a number of search functions and services to users that access the networked system 102. The search applications 121 may allow users to submit queries and receive results responsive to the queries. The search applications 121 may be linked to or part of the marketplace applications 120. Accordingly, searches may be run by the search application 121 to find items for sale through the marketplace applications 120.

The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace, search, and payment applications 120, 121, and 122 are shown in FIG. 1 to each form part of the networked system 102, it will be appreciated that, in alternative embodiments, the search applications 121 may form part of a search service that is separate and distinct from the networked system 102. Likewise, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace, search, and payment applications 120, 121, and 122 could also be implemented as standalone software programs, which do not necessarily have networking capabilities.

The web client 106 accesses the various marketplace, search, and payment applications 120, 121, and 122 via the web interface supported by the web server 116. Similarly, the programmatic client 108 accesses the various services and functions provided by the marketplace, search, and payment applications 120, 121, and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

The client machine 110 or 112 may present information to a user. For example, the client machine 110 may be running a web browser presenting a web page. The user may indicate a search query to the client machine 110. For example, the user may type a search query into a text field, select an item to search for similar or related items, upload an image to search for similar or related items, or any suitable combination thereof. One item is similar to another if they are substitutes for each other. For example, one television may be similar to another television. One item is related to another if they work together or are frequently purchased together. For example, peanut butter may be related to jelly, or a universal remote control may be related to a television.

The client machine 110 or 112 may submit the search query to an application server 118 running a search application 121. The application server 118 may submit the search query to the item database (e.g., the database 126). The application server 118 may send the results of the search query back to the client machine 110 or 112. In some example embodiments, a subset of the results of the search query is sent to the client machine 110 or 112. The number of items in the subset may be based on the number of items that fit on the display of the client machine 110 or 112, the available memory on the client machine 110 or 112, the number of items viewed by an average user after submitting the search query, the number of items viewed by this user after submitting other search queries, or any suitable combination thereof. The client machine 110 or 112 may present a first page of the results along with a pagination control operable to select additional pages of results. One or more of the additional pages of results may have been preloaded from the application server 118 by the client machine 110 or 112. The number of pages of additional results that were preloaded may be based on the available memory on the client machine 110 or 112, the number of items viewed by an average user after submitting the search query, the number of items viewed by this user after submitting other search queries, or any suitable combination thereof. The number of items viewed by an average user after submitting the search query may be determined by the application server 118 running the search application 121 by analyzing previous searches run by users and the subsequent user activity. The calculation of the number of items viewed by the average user is discussed in more detail below, with respect to FIG. 2.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, search, or payment functions that are supported by the relevant applications of the networked system 102.

Figure 2:
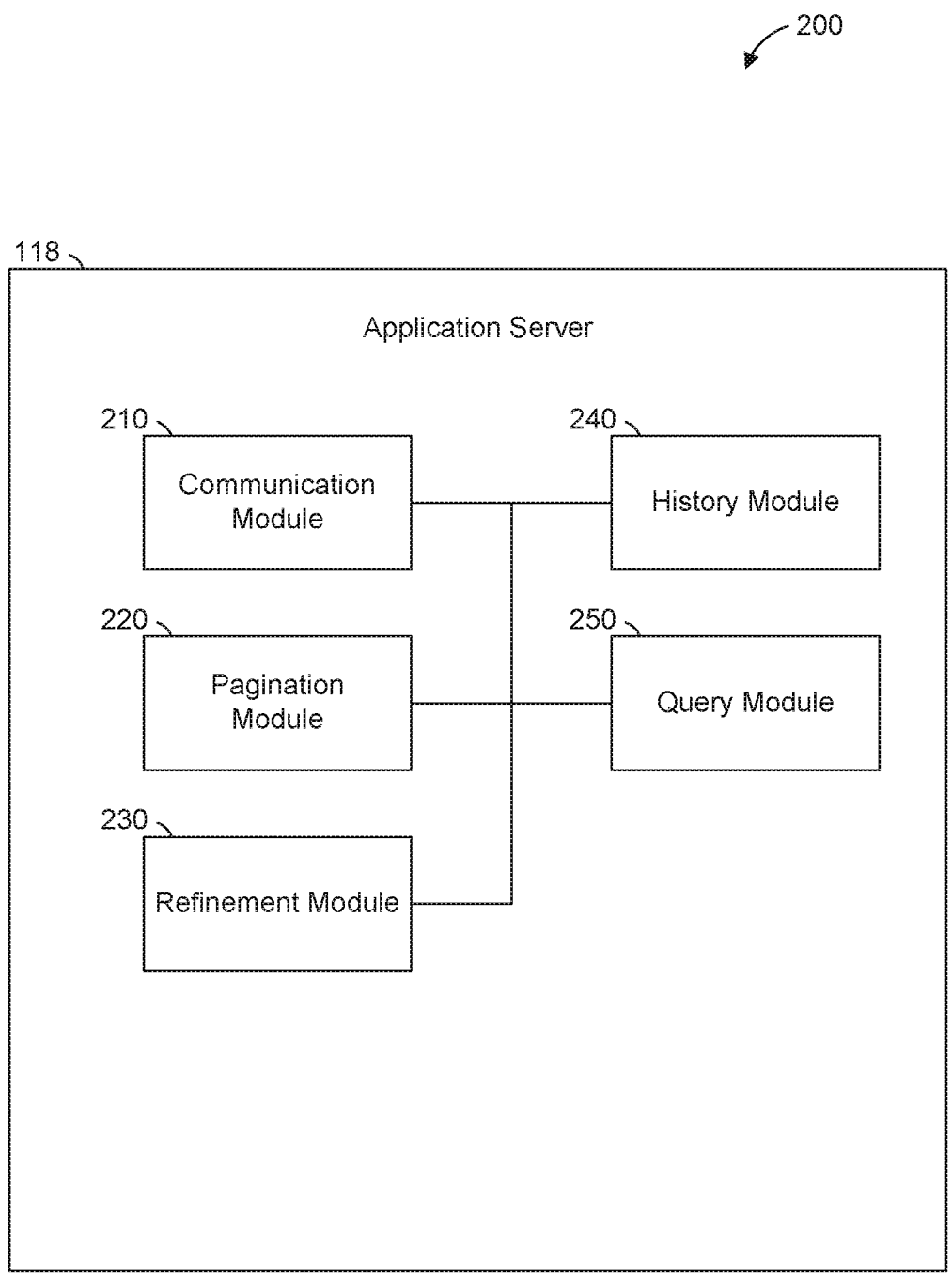
FIG. 2 is a block diagram illustrating components of an application server, in accordance with an example embodiment, suitable for seamless pagination.

FIG. 2 is a block diagram 200 illustrating components of an application server 118 running a search application 121, according to some example embodiments. The application server 118 is shown as including a communication module 210, a pagination module 220, a refinement module 230, a history module 240, and a query module 250, all configured to communicate with each other (e.g., via a bus, shared memory, a switch, or APIs). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 may control communication with the client machine 110 or 112 and the database 126. The communication module 210 may also send data for storage on the application server 118 or the database 126.

Upon receiving a search query from a user device (e.g., the client machine 110 or the client machine 112), the communication module 210 may send the search query to the history module 240 to identify the past behavior of users when similar search queries were submitted in the past. For example, the average number of items viewed before an item is interacted with may vary based on the search string. To illustrate, a user may be looking to buy an iPhone 5 and search for "iPhone 5." The results generated by the query may be precisely what the user is looking for, and so the user may choose to interact with a result on the first page of results. When this behavior is aggregated over many users, the average number of items viewed before an item is interacted with after a search for "iPhone 5" may be low. By contrast, a user may be looking to buy a pair of shoes, but not know exactly which style is desired, or may simply desire to browse, and so search for "shoes." The user may browse several pages of results before finding a pair of shoes of interest. When this behavior is aggregated over many users, the average number of items viewed before an item is interacted with after a search for "shoes" may be high.

Though this detailed description discusses determining when an item is interacted with, it will be appreciated by one of skill in the art that particular forms of interaction may be used. For example, interactions with items may include viewing items, bidding on items, buying items, subscribing to items, and sharing the items on social networks. In some example embodiments, only a subset of the interactions are considered. For example, only buying an item may be considered to be an interaction with the item. Additionally, different types of interactions may be considered in a single embodiment. To illustrate, an example embodiment may consider any form of interaction by the current user to be an interaction but consider only purchases by other users to be interactions. Thus, while the description below frequently refers to interactions, the various possible combinations of types of interactions should be recognized as being within the scope of the present invention.

In another example embodiment, interactions are grouped into categories of relevance and the categories utilized as a basis for the number of pages or results to display. An example of a category may be interactions that indicate the end of a shopping session. Interactions that may be included in such a category could include, for example, purchasing an item, performing a new search in a different item category, ending the browsing sessions, navigating to a completely different website, and so forth.

The pagination module 220 may convert the average number of results viewed before an item is interacted with into an average number of pages of results. The number of items per page used to determine the number of pages of results may be a predetermined value, such as an estimated average value for all client machines, or determined based on information sent to the application server 118 from the client machine 110 or 112. For example, the client machine 110 or 112 may transmit a pixel height of the display device or a number of items capable of being displayed at once. Additional factors may be used by the pagination module 220 to determine the number of results per page or the number of pages in the pagination control, as discussed below with respect to FIGS. 21-23.

The refinement module 230 may determine which refinements to present, where to present the refinement options, and when to present the refinement options. For example, generic refinement options, context-based refinement options, and user-based refinement options may be presented. A context-based refinement option is presented based on the context of the original query. For example, an option may be presented to limit the search results to items available within a 10-mile radius of the location of the device used to generate the query. As another example, an option may be presented to refine a search for software to limit results to software that runs on the operating system of the device used to generate the query. A user-based refinement option is presented based on knowledge about the user making the query. For example, based on previous searches by the user indicating a preference for auction-based sales, a refinement may be presented to limit the current results to auction-based sales. A generic refinement option is presented based on factors other than context- and user-specific data. The refinement options may be presented in a scrollable interface along with the results. Alternatively, the initial presentation of results may not include the refinement options. Based on the average number of results viewed before an item is interacted with or the average number of pages of results viewed before an item is interacted with, a threshold may be set. Once the user has scrolled past the threshold, non-scrollable refinement options may be presented. Additional thresholds may be set, at which point additional refinement options may be presented, already-presented refinement options may be removed, or the position of the presented refinement options may be changed.

The determination to enable non-scrollable refinement options may be based on the scrolling data for other users for the same query, the scrolling data for this user for different queries, the browser type of the client machine 110, the device type of the client machine 110 or 112, the screen resolution of the client machine 110 or 112, the result set, the location of the client machine 110 or 112, the session context, and other signals. Accordingly, non-scrollable refinement options may be disabled for certain queries, based on the previous behavior of other users who have submitted the query. Likewise, non-scrollable refinement options may be disabled for certain users, based on the previous behavior of the user after submitting previous queries.

Results from the query module 250 may be limited to the number of results determined by the pagination module 220. The communication module 210 may send all or a subset of the results to the client device for display to the user. For example, the communication module 210 may send two pages worth of results to the client device, with the remaining results available upon request. In some example embodiments, the results are sent to the client machine 110 or 112 via an Ajax command that sends the results in HyperText Markup Language (HTML) format. The results may be sent in a standard pagination mode or a seamless pagination mode. A standard pagination mode shows one page of results at a time, such that when a new page of results is shown, the previous page of results is no longer shown. By contrast, a seamless pagination mode provides for the results from one page and the next page to be shown on the screen simultaneously, as the user "seamlessly" scrolls from one page to the other. This may also be known as "infinite scrolling," where scrolling down continuously adds new items to the display, thereby eliminating the need for the user to explicitly request additional pages of items.

The application server 118 may determine whether or not to enable seamless pagination. The application server 118 may receive capabilities of the client machine 110 or 112 via the communication module 210. The capabilities may be related to the display or storage of result items. For example, the height, width, or area of the display device in pixels or lines of text may be provided. These values may be useful to determine the number of items that may be displayed on a page. These values may also be useful to determine whether or not to present non-scrollable refinement options, what the threshold of scrolling should be before the non-scrollable refinement options are presented, and which non-scrollable refinement options are presented.

The amount of available memory on the client machine may be provided to the application server 118. The memory value may be useful to determine the number of items that may be prefetched. To prefetch items is to retrieve them before the user requests them to be displayed. The number of items to be prefetched may also be based on the pagination mode. In a normal pagination mode, an entire page of new results is displayed at a time, so it may be desirable to prefetch results a page, or multiple pages, at a time. In a seamless pagination mode, partial pages of new results may be displayed, so it may be desirable to prefetch results in partial pages. Other criteria may also be used to determine the number of results to prefetch, the frequency with which results are prefetched, or both. For example, the rate at which a particular user scrolls through results may be used. For a user that tends to scroll through results more quickly, it may be advantageous to prefetch more results at a time (or to prefetch results more often) in order to reduce the likelihood that the user will have to wait for results to be loaded. Similarly, the rate at which previous users have scrolled through the results of similar queries may be used. For a query that often prompts faster scrolling, it may be advantageous to prefetch more results at a time (or to prefetch results more often) in order to reduce the likelihood that the user will have to wait for results to be loaded. In some example embodiments, results are prefetched one page at a time by default, but two or three pages at a time for users who scroll more quickly or for queries that result in faster scrolling.

Figure 3:
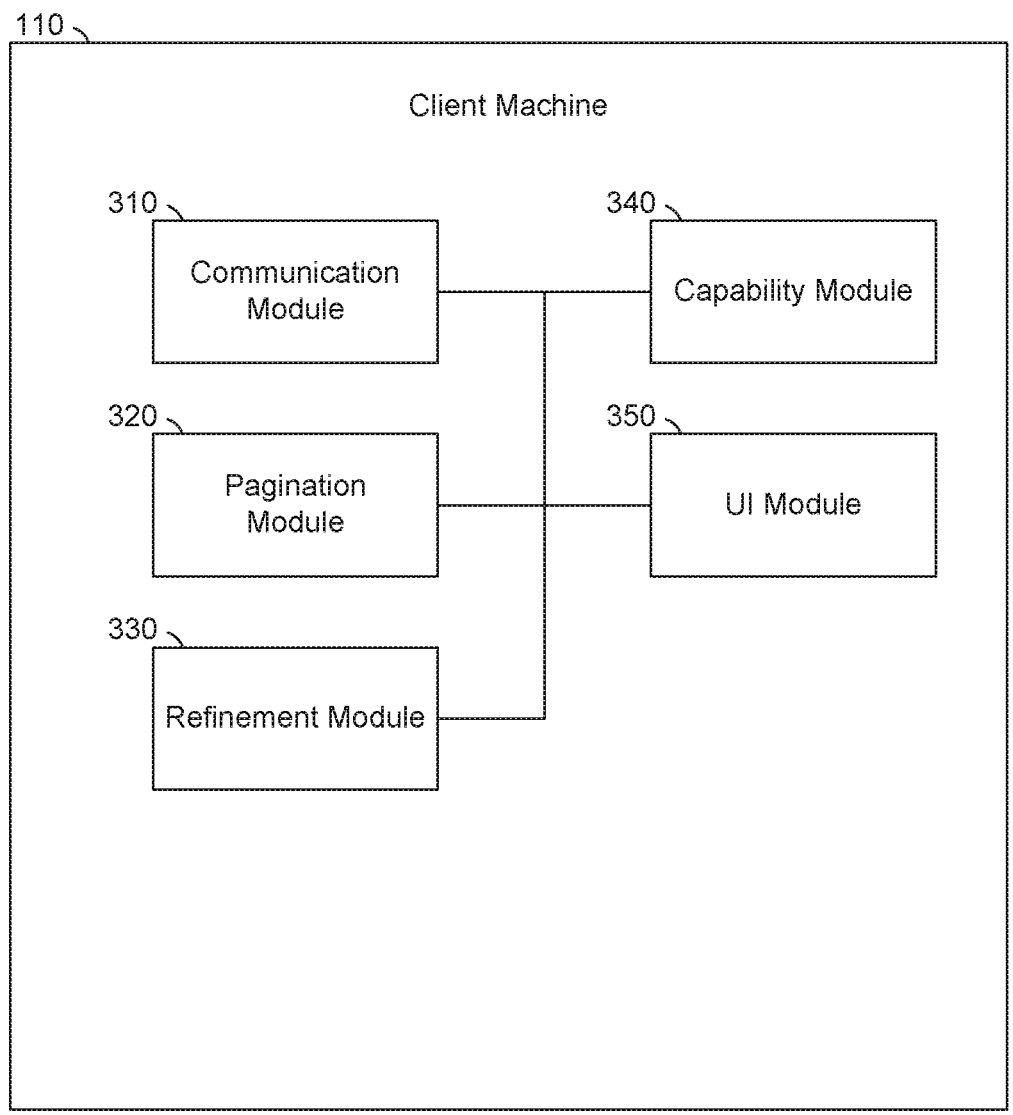
FIG. 3 is a block diagram illustrating components of a client machine, in accordance with an example embodiment, suitable for seamless pagination.

FIG. 3 is a block diagram illustrating components of a client machine 110 or 112 performing seamless pagination, according to some example embodiments. The client machine 110 or 112 is shown as including a communication module 310, a pagination module 320, a refinement module 330, a capability module 340, and a UI module 350, all configured to communicate with each other (e.g., via a bus, shared memory, a switch, or APIs). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 may receive results from the application server 118. The communication module 310 may also receive the number of pages to display in a pagination control. In some example embodiments, the communication module 310 receives a number of items to display in the pagination control, and the conversion of items to pages is performed on the client machine 110 or 112.

The communication module 310 may also receive the number of pages or items to display in a scrollable interface before displaying non-scrollable refinement options. In some example embodiments, the communication module 310 receives a number of items to display before displaying non-scrollable refinement options, and the conversion of items to pages is performed on the client machine 110 or 112.

The communication module 310 may have received results for all pages shown in the pagination module before the display of results began, may receive new results as the user scrolls through the results, or both. For example, two pages of results may initially be sent from the application server 118. Once the user begins viewing the second page of results, the communication module 310 may send a request for additional results to the application server 118 and may receive additional results. For example, the communication module 310 may receive the next page of results. Prefetching the results may provide a better user experience by reducing the amount of time the user must waits between deciding to see additional results and the presentation of those results.

The communication module 310 may have received all thresholds and corresponding non-scrollable refinement options before the display of results began, may receive new thresholds and corresponding non-scrollable refinement options as the user scrolls through the results, or both. For example, one threshold and corresponding non-scrollable refinement option may initially be sent from the application server 118. Once the user scrolls past the first threshold, the communication module 310 may send a request for additional thresholds and corresponding refinement options to the application server 118, and may receive additional thresholds and corresponding refinement options. For example, the communication module 310 may receive the next threshold and corresponding refinement option.

When the pagination module 320 detects that the user is attempting to scroll past the current pagination range (e.g., past the last of the items indicated for display by the application server 118), the pagination module 320 may prevent the user from viewing more results or allow the user to continue looking at additional results. Regardless of whether the user is prevented from viewing additional results, a notification may be presented, suggesting to the user that the most relevant results have already been presented. The notification may request a confirmation that the user wishes to see more results. In some example embodiments, the pagination module 320 causes the UI module 350 to replace the present page numbers with the next set of numbers of the same size. For example, if the current page list is 1, 2, 3, and the user wants to see additional results, the page list may be updated to 4, 5, 6. In alternative embodiments, the pagination module 320 causes the UI module 350 to increment or decrement the current page list, while keeping the current page list the same size. For example, if the current page list is 1, 2, 3, and the user wants to see additional results, the page list may be updated to 2, 3, 4. In still other embodiments, the pagination module 320 causes the UI module 350 to add the new page to the page list, while keeping the current elements in place. For example, if the current page list is 1, 2, 3, and the user wants to see additional results, the page list may be updated to 1, 2, 3, 4. The results for the new page may be prefetched as described above, or may be fetched in response to the user requesting the page that is not part of the current pagination range.

When the refinement module 330 detects that the user is attempting to scroll past a final threshold (e.g., past the last of the thresholds indicated by the application server 118), the refinement module 330 may present a notification, suggesting to the user that election of a refinement option may be helpful. The notification may request a confirmation that the user wishes to see more results without applying a refinement option.

The capability module 340 may also identify a web browser being used to view the result set. The application server 118 may require certain web browsers in order to enable certain options, prevent certain web browsers from accessing certain options, or both. For example, the capability module 340 may identify a browser that does not support seamless pagination. In this case, the server may respond to a search query with data to be presented in the default pagination format. The capability module 340 may also identify a view type of results, such as list view or gallery view. In a list view, a list of items is shown. In a gallery view, a two-dimensional array of items is shown. The application server 118 may support seamless pagination for list view, gallery view, both, or neither. The capability module 340 may identify a number of items per page. The application server 118 may support seamless pagination when the items per page are below a threshold (e.g., 50), above a threshold (e.g., 5), or within a specified range (e.g., 5-50). The capability module 340 may identify a sort type in which the items are to be displayed. For example, items may be sorted by relevance, date, price, proximity to the user, or any appropriate combination thereof. The application server 118 may support seamless pagination for some sort types but not for others. In some example embodiments, the capability module 340 determines the number of items that may be displayed on a page and provides that data to the communication module 310 for transmission to the application server 118.

The capability module 340 may identify a browser that does not support non-scrollable elements. In this case, the server may respond to a search query with data to be presented without the use of non-scrollable refinement options. The application server 118 may support non-scrollable refinement options for list view, gallery view, both, or neither. The application server 118 may support the presentation of non-scrollable refinement options when the items per page are below a threshold (e.g., 50), above a threshold (e.g., 5), or within a specified range (e.g., 5-50). The application server 118 may support non-scrollable refinement options for some sort types but not for others.

The UI module 350 may present a UI to a user, operable to submit a search query. The communication module 310 may submit the search query to the application server 118 running the search application 121. The capability module 340 may identify capabilities of the client machine 110 or 112, for transmission to the application server 118 by the communication module 310. The capabilities may be related to the display or storage of result items. For example, the height, width, or area of the display device in pixels or lines of text may be provided. As other examples, any combination of the following may be provided: the amount of available memory, the web browser being used to view the result set, the view type of results (e.g., list view or gallery view), the number of items per page, and the sort type in which the items are to be displayed The UI module 350 may display the first page of results along with a pagination control generated by the pagination module 320. The user may scroll through the results. The pagination module 320 may detect when the screen begins showing a new page, when the screen is showing more of a new page than an old page, or when the screen is no longer showing the old page. Based on any of these events, the pagination module 320 may determine that the old page is no longer the current page and that the new page is now the current page. The UI module 350 may update the pagination control to indicate the new current page.

The UI module 350 may display the first page of results along with a pagination control generated by the pagination module 320. The user may scroll through the results. The refinement module 330 may detect when the user has scrolled past a threshold. Based on this event, the refinement module 330 may determine to present non-scrollable refinement options. The UI module 350 may update the UI to display the non-scrollable refinement option.

In some example embodiments, a unique identifier (UID) is used for each page. The height of each item displayed may be known (for example, the height may be 112 pixels). The height of each page may be calculated from the height of each item and the number of items on each page. For example, if 48 items are on each page and the height of each item is 112 pixels, the height of a page may be 5376 pixels. When the user wants to move to the next page (e.g., by pressing the next page arrow 440 in FIG. 4, discussed below), an empty HTML DIV may be created with the height of the page. An Ajax call may be made to the application server 118 to request data for the new page. The data sent by the application server 118 may be stored in the HTML session storage. Data for other pages may be deleted from the session storage as well. For example, data for the current, previous, and next pages may be stored, and data for any other page may be removed from the session storage. In some example embodiments, when the user scrolls toward a page for which data is not already loaded, data for that page is loaded when the user gets within a threshold distance from the new page. For example, the page may be larger than the screen, so that the user initially sees only a portion of the first page. The user may scroll down a distance and still be only in the middle of the first page. The user may then scroll near to the end of the first page, and trigger the loading of the second page. The threshold distance may be measured in pixels (e.g., 1000 pixels), items (e.g., 10 items), or any suitable combination thereof.

Figure 4:
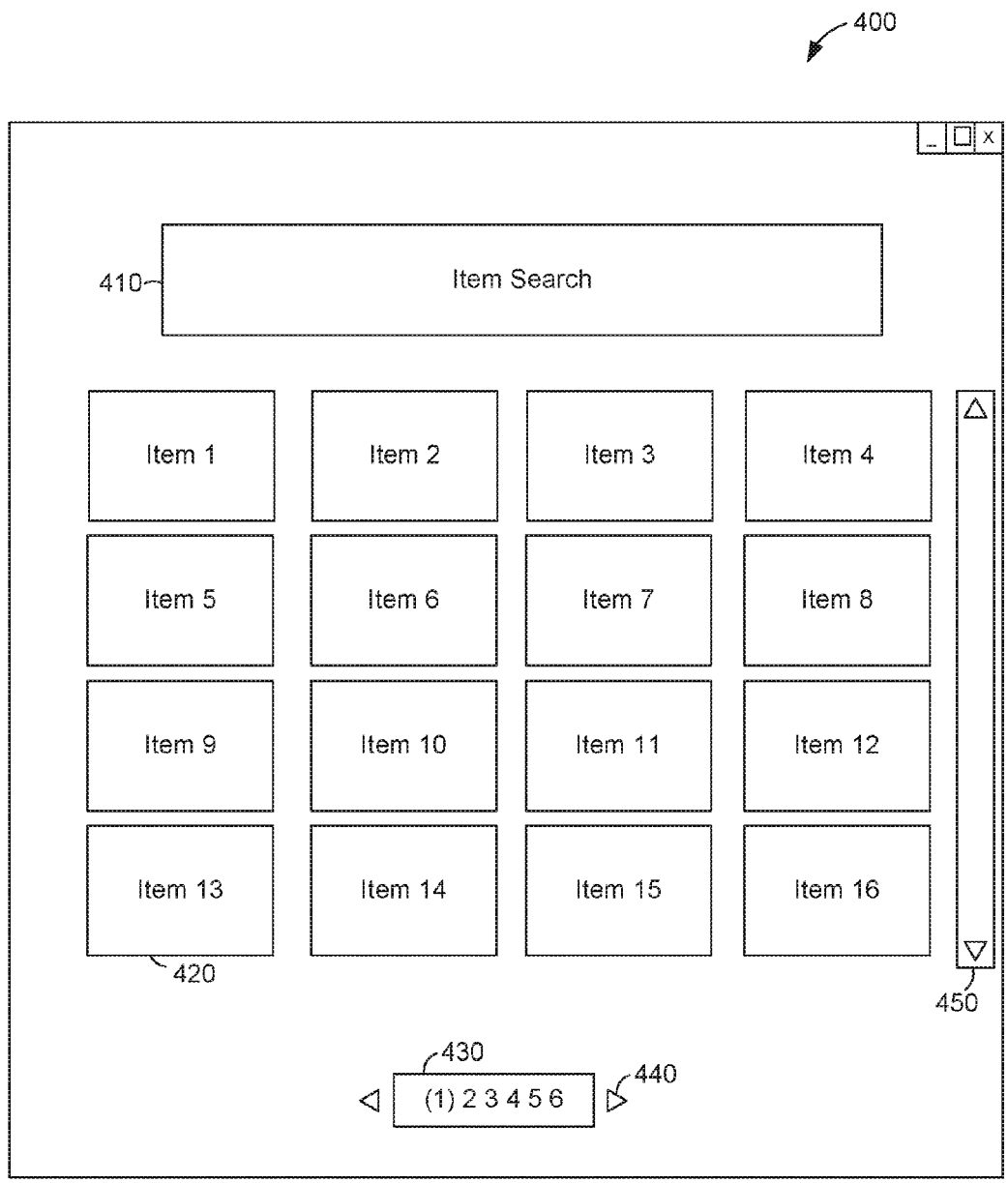
FIG. 4 is a screen diagram of a user interface (UI), in accordance with an example embodiment, suitable for seamless pagination.

FIG. 4 shows a screen diagram 400 of a UI for seamless pagination, according to some example embodiments. Text entry field 410 shows the current search query and allows the user to enter a new search query. Items 420 are items responsive to the search query. Page indicator 430 indicates the current page and shows other pages in the current page range. Arrows 440 allow the user to move forward or backward through the result set a page at a time. The pagination tool comprises the page indicator 430 and the arrows 440. Scroll tool 450 allows the user to move forward or backward through the result set a row at a time. Screen diagram 400 shows the first sixteen items 420 being displayed on a first page, as indicated by the page indicator 430.

Figure 5:
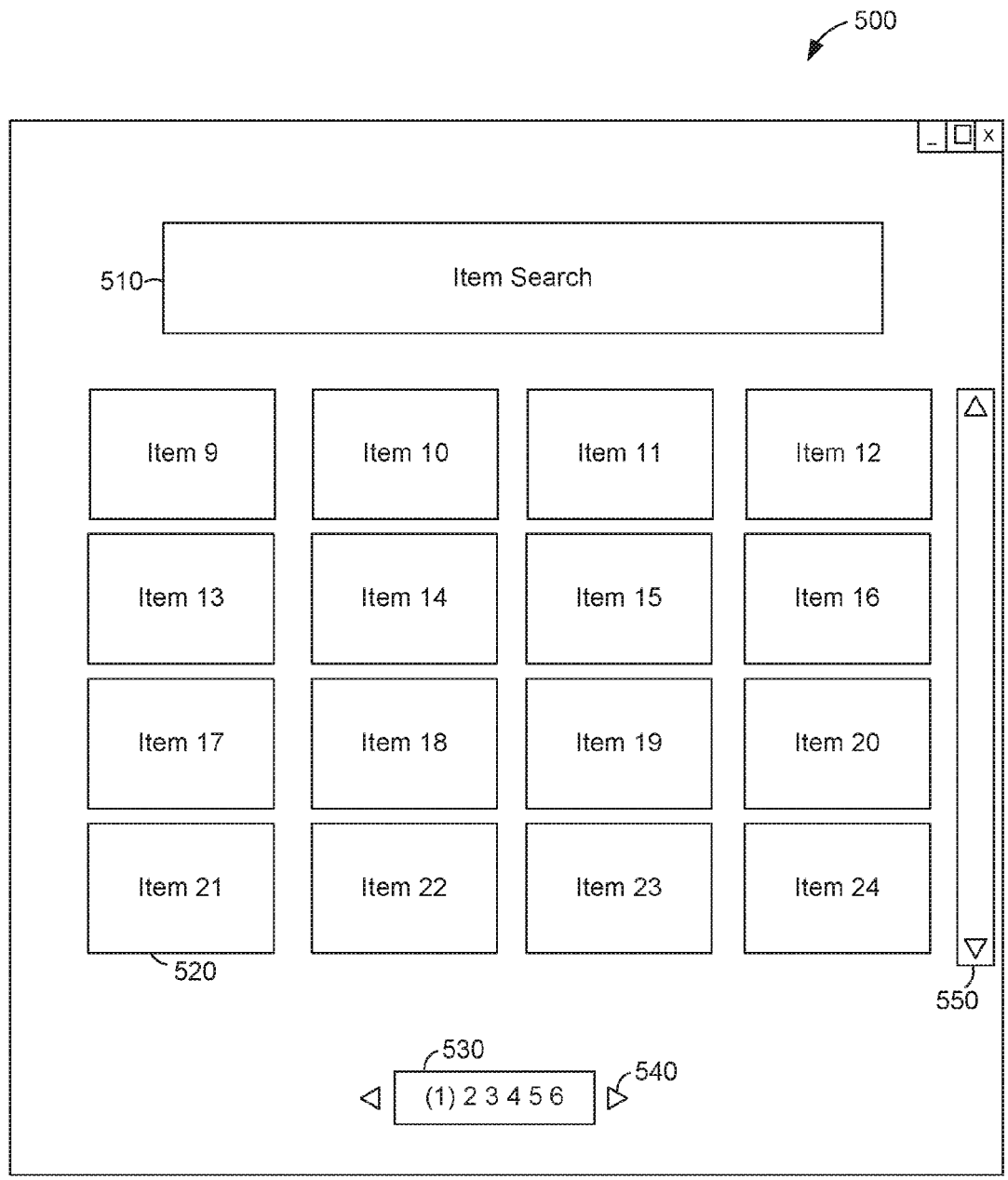
FIG. 5 is a screen diagram of a UI, in accordance with an example embodiment, suitable for seamless pagination.

FIG. 5 shows a screen diagram 500 of a UI for seamless pagination, according to some example embodiments. Text entry field 510 shows the current search query and allows the user to enter a new search query. Items 520 (labelled 9-24) are displayed, after the user has scrolled down two lines relative to the screen diagram 400. Page indicator 530 indicates that this is still considered to be page 1. Page indicator 530, arrows 540, and scroll tool 550 are substantially as described above with respect to the corresponding elements of screen diagram 400.

Figure 6:
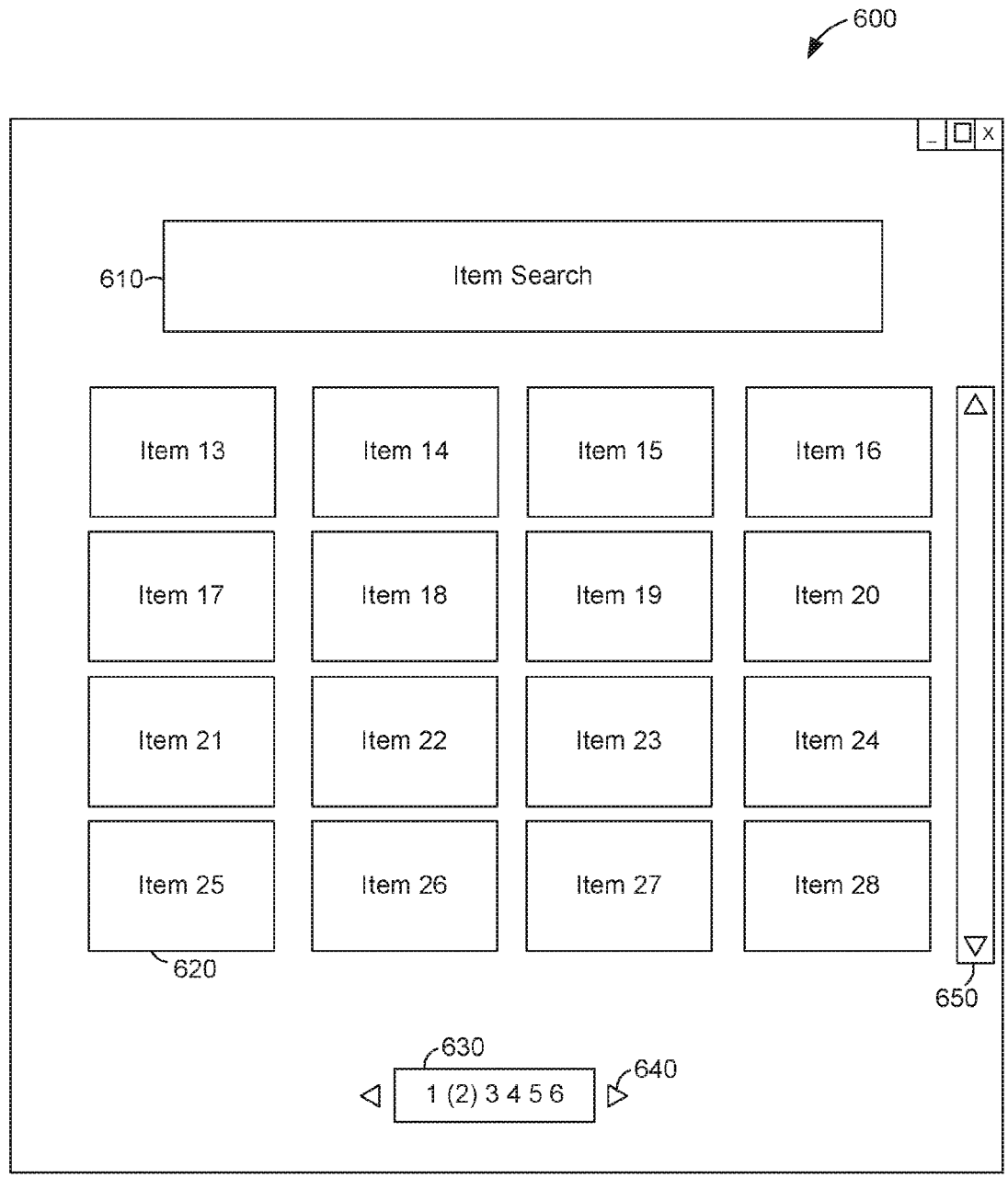
FIG. 6 is a screen diagram of a UI, in accordance with an example embodiment, suitable for seamless pagination.

FIG. 6 shows a screen diagram 600 of a UI for seamless pagination, according to some example embodiments. Text entry field 610 shows the current search query and allows the user to enter a new search query. Items 620 (labelled 13-28) are displayed, after the user has scrolled down an additional row relative to the screen diagram 500. Page indicator 630 now shows that the current page is page 2. If the user chooses to scroll back to page 1, the items for page 1 may be retrieved from session storage. The user may select a page number shown in the page indicator 630. Responsive to such a selection, the pagination tool may cause the display of items to jump to the selected page. Empty space may be created to represent the skipped pages. For example, if the user is currently viewing page 2 and selects page 6, empty space may be created corresponding to the skipped pages 3, 4, and 5, and the current location may be updated to the top of page 6. In some example embodiments, one or more of pages 3-6 will have been preloaded. In these embodiments, empty space may be created only for the pages that have not been preloaded. The pixel position of a page may be calculated by multiplying the height of each page, in pixels, by the number of the page. The current page and the total number of visited pages may be stored in the session storage. When the user scrolls to a new page or presses the next page arrow, the current page number and total number of pages may be incremented. When the user scrolls to a previous page or presses the previous page arrow, the current page number may be decremented.

In some example embodiments, the text entry field 610 may be "sticky," or non-scrollable, and keep its location on the screen as the user scrolls or paginates through the results. Likewise, the pagination tool may be sticky. The pagination tool may also include an element (not shown) operable to return to the first page of search results. Page indicator 630, arrows 640, and scroll tool 650 are substantially as described above with respect to the corresponding elements of screen diagram 400.

Figure 7:
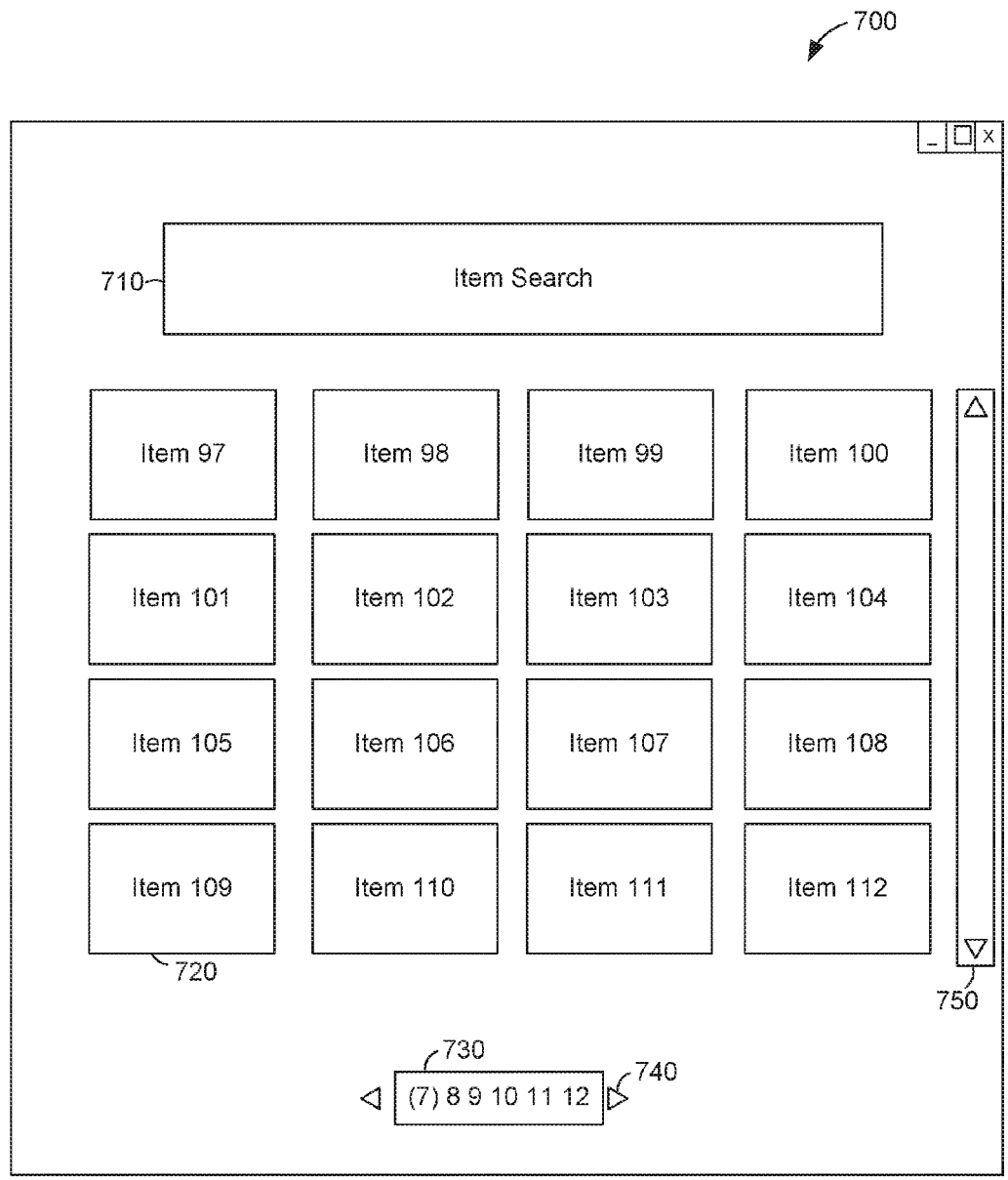
FIG. 7 is a screen diagram of a UI, in accordance with an example embodiment, suitable for seamless pagination.

FIG. 7 shows screen diagram 700 of a UI suitable for seamless pagination, according to some example embodiments. Text entry field 710 shows the current search query and allows the user to enter a new search query. Items 720 (labelled 97-112) are displayed, for example, after the user has opted to see more items after reaching the end of the initial six pages. Page indicator 730 indicates that the current page is page 7, and presents a page range of 7-12. Page indicator 730, arrows 740, and scroll tool 750 are substantially as described above with respect to the corresponding elements of screen diagram 400.

The user may select an item of the displayed items, causing a page for the item to be displayed. After viewing the page for the item, the user may click the back button on the web browser in order to return to the result list or otherwise cause the browser to return to the result list. By default, the web browser may reload the page and display the top of the result list. The user may prefer to return to the page most recently viewed. In some example embodiments, the page most recently viewed is stored (e.g., in session storage of a web browser, in a data structure of a dedicated application, etc.) so that after the user returns to the result list, the user is returned to the previous position rather than the top of the results. To facilitate the display of the previously viewed page, the pixel position of the page most recently viewed by the user may be determined by accessing the current page and the total number of visited pages from session storage. Empty pages may be created using the document object model (DOM) by creating empty DIVs with fixed height in the document.ready( ) function. Data for the items in the current page and previous page may be accessed from session storage. Alternatively, data for the items to be displayed may be retrieved from the application server 118 (e.g., via an Ajax call). The decision to retrieve the data from the application server 118 may be based on the unavailability of the data from session storage. The user may use a web browser to bookmark the results page. The later use of the bookmark may return the user to the first page of the results.

After the user returns to the result list from viewing an item, the items in the result list that have already been viewed by the user may be indicated on the screen. For example, items that the user had previously scrolled past may be indicated with a background of a particular color, a border of a particular color, an icon, a checkbox, or any suitable combination thereof. Items that the user had previously selected for a detail view may be indicated with a background of a different color, a border of a different color, a different icon, a checkbox in a different location, or any suitable combination thereof. These visual indicators may help a user to continue browsing at the same location and to recognize whether the results being viewed are new results or results that have already been seen, which may help the user to more quickly find an item of interest.

Figure 8:
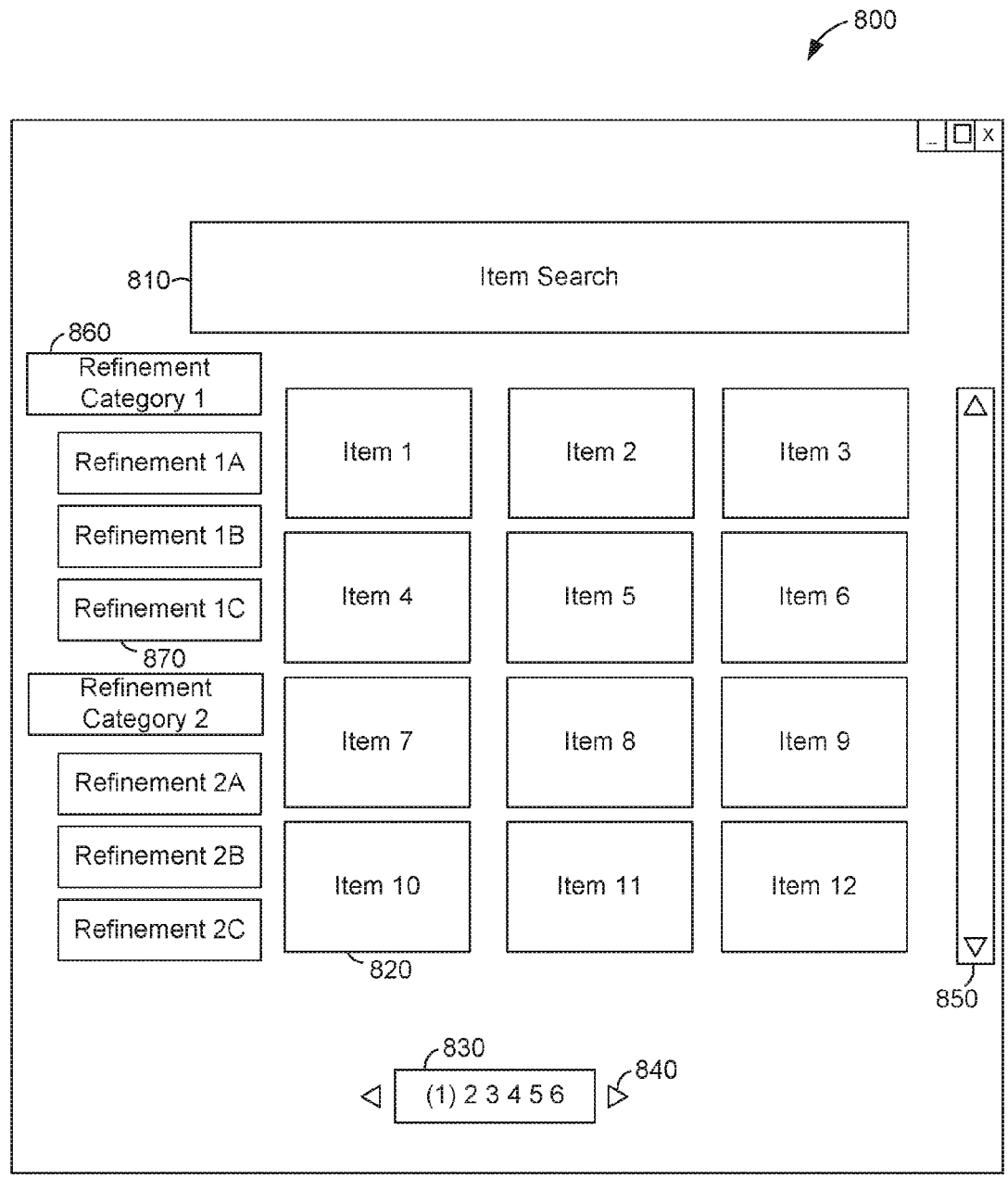
FIG. 8 is a screen diagram of a UI, in accordance with an example embodiment, suitable for contextual refinement during seamless pagination.

FIG. 8 shows a screen diagram 800 of a UI for contextual refinement during seamless pagination, according to some example embodiments. Text entry field 810 shows the current search query and allows the user to enter a new search query. Scrollable refinement categories (e.g., the scrollable refinement category 860) and scrollable refinement options (e.g., the scrollable refinement option 870) may be operable to enable refinement options. Screen diagram 800 shows the first twelve items 820 being displayed on a first page, as indicated by the page indicator 830. The page indicator 830 indicates the current page and shows other pages in the current page range. The arrows 840 allow the user to move forward or backward through the result set (e.g., a page at a time). The pagination tool comprises the page indicator 830 and the arrows 840. Scroll tool 850 allows the user to move forward or backward through the result set (e.g., a row at a time or a page at a time). In some example embodiments, the text entry field 810 may be non-scrollable and keep its location on the screen as the user scrolls or paginates through the results. Likewise, the pagination tool may be non-scrollable. The pagination tool may also include an element (not shown) operable to return to the first page of search results.

Figure 9:
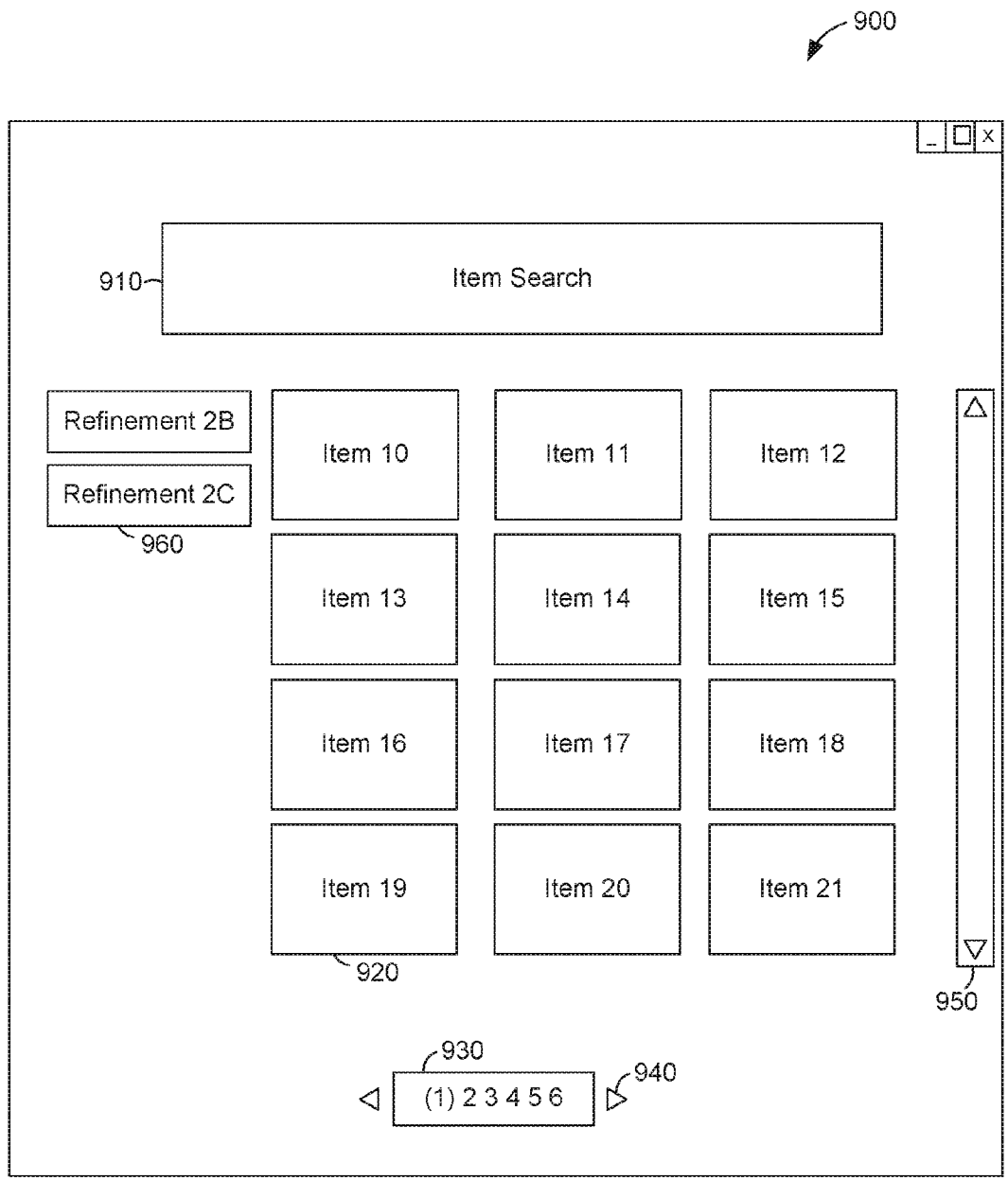
FIG. 9 is a screen diagram of a UI, in accordance with an example embodiment, suitable for contextual refinement during seamless pagination.

FIG. 9 shows a screen diagram 900 of a UI for contextual refinement during seamless pagination, according to some example embodiments. The screen diagram 900 may be presented after the user of screen diagram 800 has scrolled down three lines. Text entry field 910 shows the current search query and allows the user to enter a new search query. Scrollable refinement categories (e.g., the scrollable refinement category 860) and scrollable refinement options (e.g., the scrollable refinement option 870) may have scrolled off the screen. Other scrollable refinement categories and scrollable refinement options (e.g., the scrollable refinement option 960) may be operable to enable refinement options. Screen diagram 900 shows the items 920 (labeled as items 10-21) being displayed on a first page, as indicated by the page indicator 930. The page indicator 930 indicates the current page and shows other pages in the current page range. The arrows 940 allow the user to move forward or backward through the result set a page at a time. The pagination tool comprises the page indicator 930 and the arrows 940. Scroll tool 950 allows the user to move forward or backward through the result set (e.g., a row at a time or a page at a time).

Figure 10:
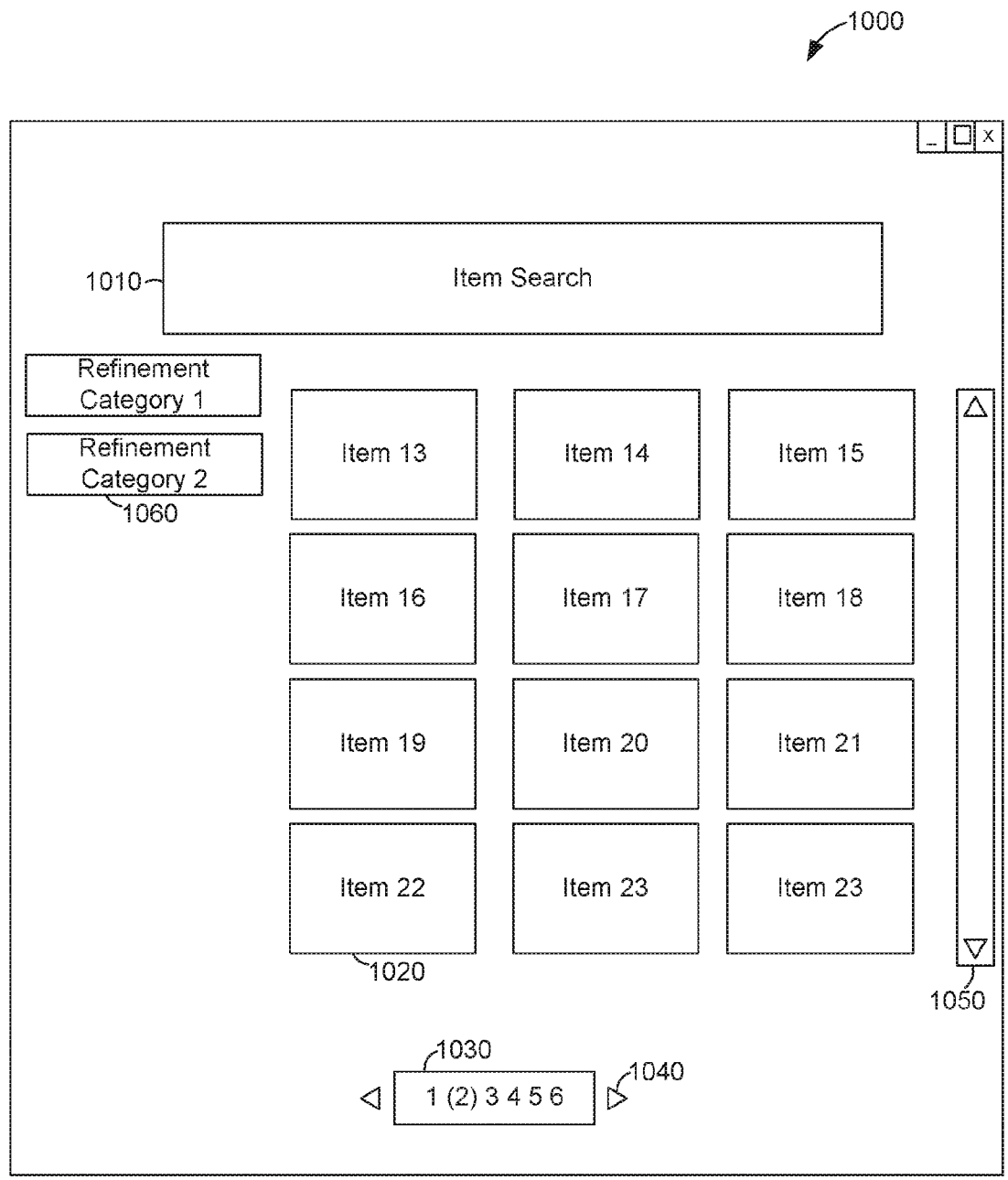
FIG. 10 is a screen diagram of a UI, in accordance with an example embodiment, suitable for contextual refinement during seamless pagination.

FIG. 10 shows a screen diagram 1000 of a UI for contextual refinement during seamless pagination, according to some example embodiments. Screen diagram 1000 shows items 1020 (labelled items 13-23) being displayed, after the user has scrolled down an additional row relative to the screen diagram 900. Text entry field 1010 shows the current search query and allows the user to enter a new search query. Non-scrollable refinement categories (e.g., the non-scrollable refinement category 1060) may have been added as UI elements in response to the user scrolling past a threshold. The page indicator 1030 indicates the current page and shows other pages in the current page range. The arrows 1040 allow the user to move forward or backward through the result set a page at a time. The pagination tool comprises the page indicator 1030 and the arrows 1040. Scroll tool 1050 allows the user to move forward or backward through the result set (e.g., a row at a time or a page at a time).

The determination to present refinement categories instead of refinement options may be based on the available screen real estate. For example, the complete set of refinement options may not fit on the screen. Based on the determination that the screen is too small to hold all refinement options, refinement categories, operable to cause the display of the refinement options, may be presented.

The determination to present refinement categories may be based on past user behavior. For example, if users presented with many refinement options are overwhelmed by the number of choices and instead abandon their search, presenting a smaller number of categories may be less intimidating to the user. Past user behavior may direct this by showing a higher interaction rate for users presented with refinement categories rather than refinement options.

In some example embodiments, both refinement categories and refinement options are presented. For example, refinement categories may be presented as category headers for refinement options and be inoperable. As another example, frequently-used categories may be expanded to display refinement options while rarely-used categories are presented only as categories. Past user behavior may direct this by showing a higher interaction rate for users with options in certain refinement categories.

Figure 11:
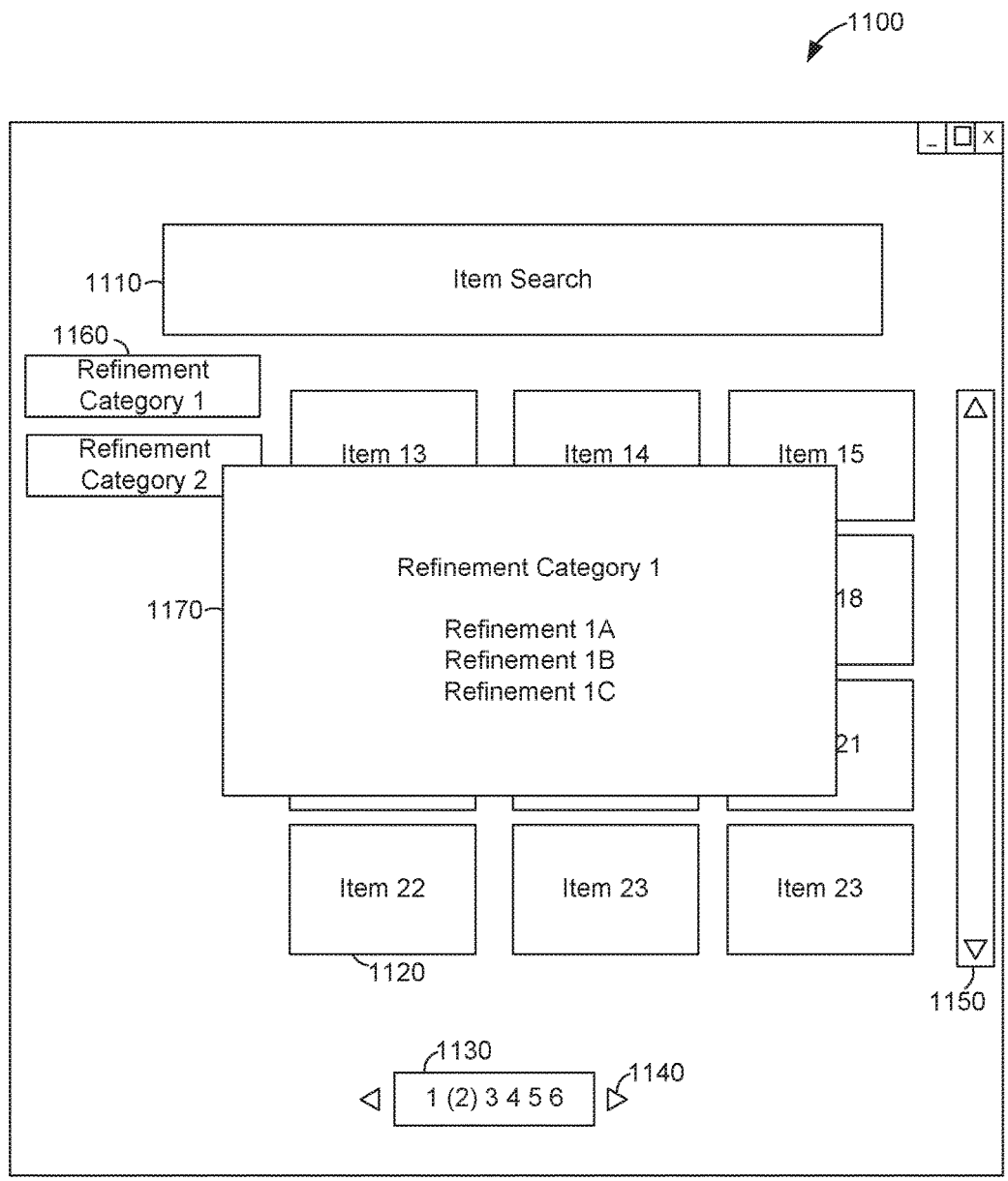
FIG. 11 is a screen diagram of a UI, in accordance with an example embodiment, suitable for contextual refinement during seamless pagination.

FIG. 11 shows a screen diagram 1100 of a UI for contextual refinement during seamless pagination, according to some example embodiments. The screen diagram 1100 may be displayed after the user has activated (e.g., clicked on) the non-scrollable refinement category 1160. Text entry field 1110 shows the current search query and allows the user to enter a new search query. The UI element 1170 may be displayed in response to the activation of the non-scrollable refinement category 1160. The UI element 1170 includes an indication of the category (e.g., "Refinement Category 1") as well as three refinement options (e.g., "Refinement 1A," "Refinement 1B," and "Refinement 1C"). The refinement options may be operable to apply the indicated refinements to the search results. For example, a brand refinement may limit the search results to a particular brand of item. Accordingly, selecting the brand refinement may cause a screen diagram 400 or 800 with search results for the refined query to be presented to the user. The screen diagram 1100 shows items 1120 (labelled items 13-23) being displayed (the same items as shown in the screen diagram 1000). The non-scrollable refinement categories (e.g., the non-scrollable refinement category 1160) shown in the screen diagram 1000 are also still displayed. In some example embodiments, the non-scrollable refinement categories are hidden while the UI element 1170 is displayed. The page indicator 1130 indicates the current page and shows other pages in the current page range. The arrows 1140 allow the user to move forward or backward through the result set a page at a time. The pagination tool comprises the page indicator 1130 and the arrows 1140. Scroll tool 1150 allows the user to move forward or backward through the result set (e.g., a row at a time or a page at a time).

Figure 12:
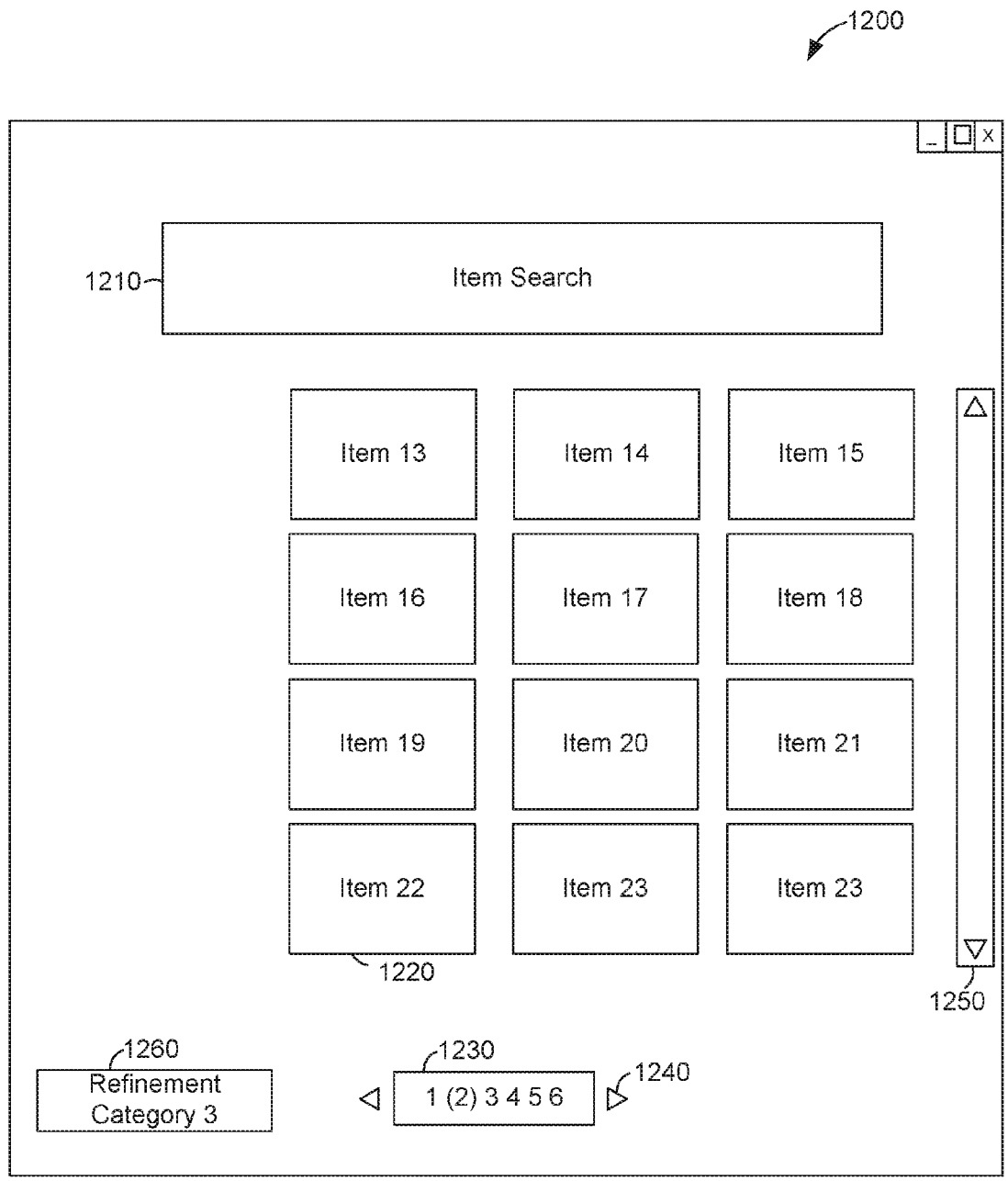
FIG. 12 is a screen diagram of a UI, in accordance with an example embodiment, suitable for contextual refinement during seamless pagination.

FIG. 12 shows a screen diagram 1200 of a UI for contextual refinement during seamless pagination, according to some example embodiments. Screen diagram 1200 shows items 1220 (labelled items 13-23) being displayed, after the user has scrolled down an additional row after viewing the screen diagram 900 of FIG. 9. Text entry field 1210 shows the current search query and allows the user to enter a new search query. Non-scrollable refinement categories (e.g., the non-scrollable refinement category 1260) may have been added as UI elements in response to the user scrolling past a threshold. As illustrated by FIG. 12, the non-scrollable refinement category 1260 may be placed in a different location than the scrollable refinement categories that have scrolled off of the page. As further illustrated by FIG. 12, the non-scrollable refinement category 1260, labeled "Refinement Category 3," may be a different category than the scrollable refinement categories that have scrolled off of the page. For example, the scrollable refinement categories may be generic categories while the non-scrollable refinement category 1260 may be user- or context-specific. For example, the generic categories may be based on the search results (e.g., the categories to which the highest numbers of results belong or the categories to which the highest numbers of frequently-purchased results belong). Meanwhile, the user-specific refinement categories may be based on prior refinements applied by the user. For example, a user may frequently filter the results by price, preferring to see only items costing less than $100. As a result, a user-based refinement category may be a category of price filters, from which the user may select an individual refinement for price. Similarly, the context-specific refinement categories may be based on the context of the query. For example, a query may be issued from a mobile device at a location. As a result, a context-based refinement category may be a category of location filters, from which the user may select an individual refinement for results within a certain distance of the location of the mobile device.

The page indicator 1230 indicates the current page and shows other pages in the current page range. The arrows 1240 allow the user to move forward or backward through the result set a page at a time. The pagination tool comprises the page indicator 1230 and the arrows 1240. Scroll tool 1250 allows the user to move forward or backward through the result set (e.g., a row at a time or a page at a time).

Figure 13:
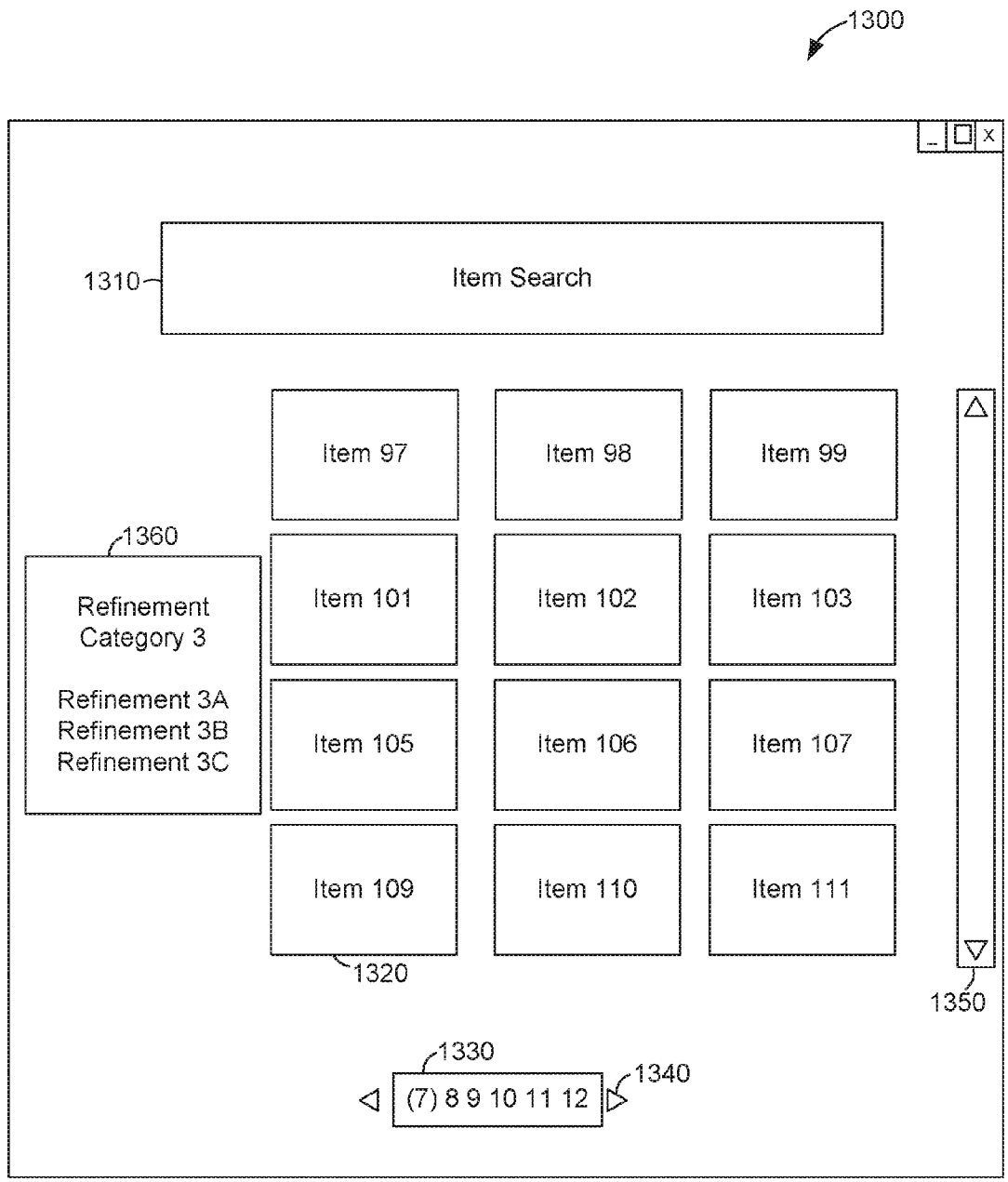
FIG. 13 is a screen diagram of a UI, in accordance with an example embodiment, suitable for contextual refinement during seamless pagination.

The screen diagram 1300 of FIG. 13 shows items 1320 (labelled 97-111) being displayed, after the user has opted to see more items after reaching the end of the initial six pages. Text entry field 1310 shows the current search query and allows the user to enter a new search query. Page indicator 1330 indicates that the current page is page 7, and presents a page range of 7-12.

The non-scrollable refinement option 1360 may have been generated from the non-scrollable refinement category 1260 based on the user scrolling past a threshold. For example, the non-scrollable refinement category 1260 may have been presented based on the user scrolling past a first threshold. The non-scrollable refinement category option may have been moved upward, to a more central position, based on the user scrolling past a second threshold. The non-scrollable refinement category option may have been expanded, to include the refinements 3A, 3B, and 3C, based on the user scrolling past a third threshold. The UI element 1360 includes an indication of the category (e.g., "Refinement Category 3") as well as three refinement options (e.g., "Refinement 3A," "Refinement 3B," and "Refinement 3C"). The refinement options may be operable to apply the indicated refinements to the search results. For example, a brand refinement may limit the search results to a particular brand of item. Accordingly, selecting the brand refinement may cause the user to be presented a screen diagram 400 or 800, with search results for the refined query.

The page indicator 1330 indicates the current page and shows other pages in the current page range. The arrows 1340 allow the user to move forward or backward through the result set (e.g., a page at a time). The pagination tool comprises the page indicator 1330 and the arrows 1340. Scroll tool 1350 allows the user to move forward or backward through the result set (e.g., a row at a time or a page at a time).

Figure 14:
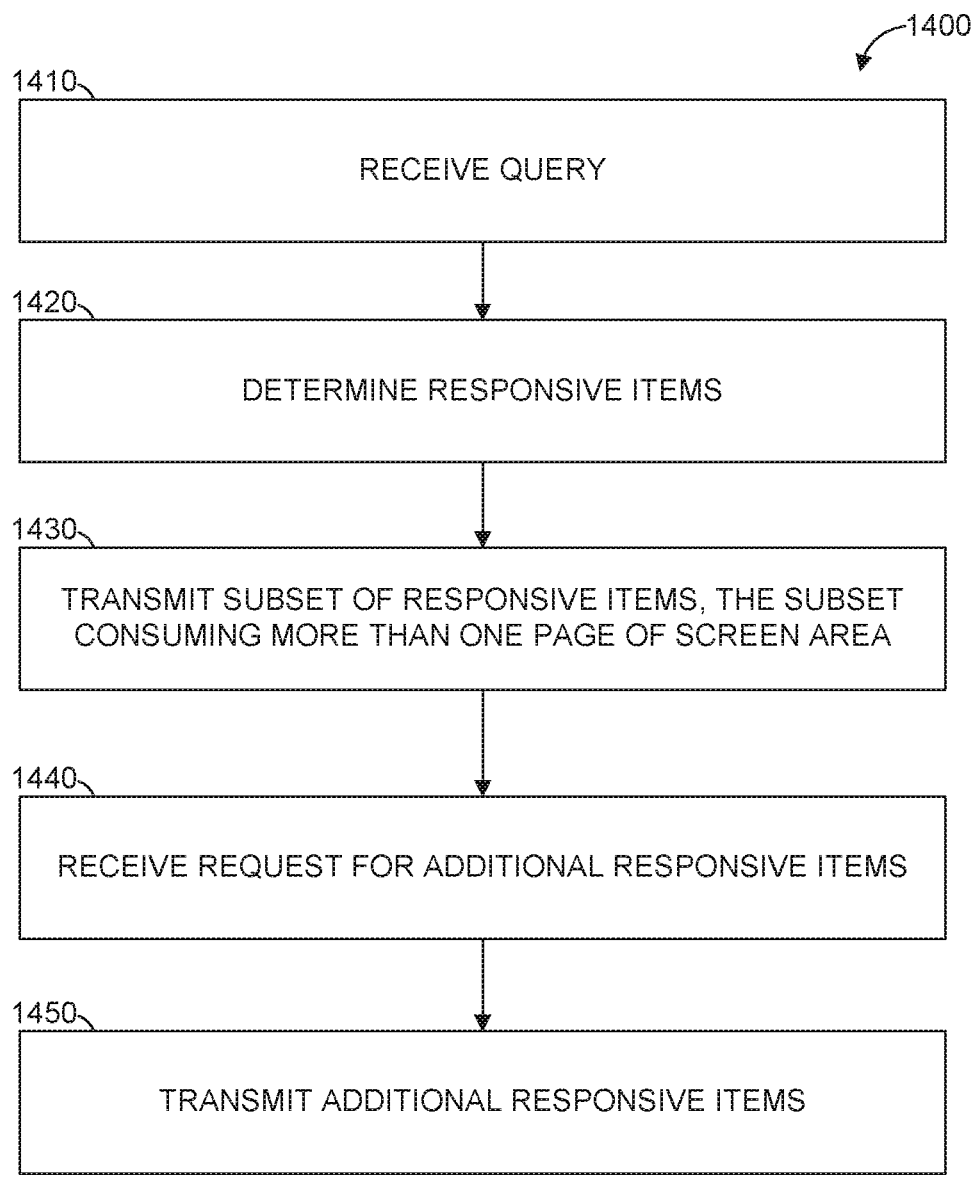
FIG. 14 is a flowchart illustrating operations of an application server, in accordance with an example embodiment, suitable for seamless pagination.

FIG. 14 is a flowchart illustrating operations of an application server 118 in performing a method 1400 of seamless pagination, according to some example embodiments. Operations in the method 1400 may be performed by the search application 121 running on the application server 118, using modules described above with respect to FIG. 2.

The search application 121 may receive a search query (operation 1410), e.g., from the client machine 110 or 112 searching for items for sale. The search application 121 may run the query and identify the responsive items (operation 1420). In response to the search query, the search application 121 may transmit a subset of the responsive items to the client machine 110 or 112 (operation 1430). The subset of the responsive items may be sufficient to cover more than one page of screen area. The number of items transmitted may be based on capability data received from the client machine 110 or 112, history data accessible by the application server 118, or both. The application server 118 may receive a request for additional responsive items (operation 1440), and transmit additional results in response to the request (operation 1450).

Figure 15:
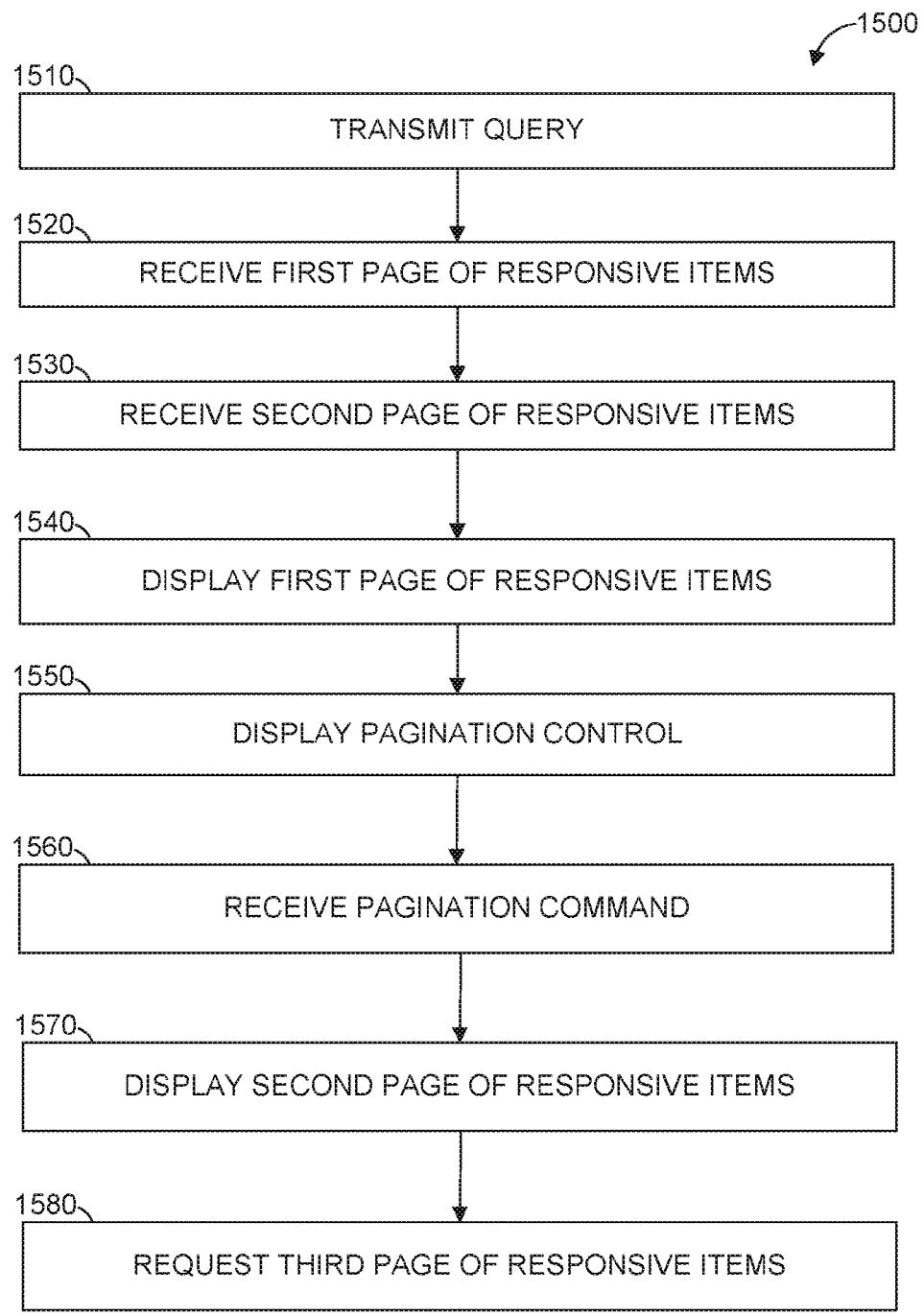
FIG. 15 is a flowchart illustrating operations of a client machine, in accordance with an example embodiment, suitable for seamless pagination.

FIG. 15 is a flowchart illustrating operations of a client machine 110 or 112 in performing a method 1500 of seamless pagination, according to some example embodiments. Operations in the method 1500 may be performed by the client machine 110 or 112, using modules described above with respect to FIG. 3.

The client machine 110 or 112 may transmit a search query (operation 1510). For example, the search query may be received by the UI module 350 or entered into the text entry field 410. The search query may be transmitted to an application server 118 performing the method 1400, described above. In response to the search query, the client machine 110 or 112 may receive a first and second page of responsive items (operations 1520 and 1530). The client machine 110 or 112 may display the first page of responsive items along with a pagination control (operations 1540 and 1550). The client machine 110 or 112 may receive a pagination command (operation 1560). For example, a pagination command may be received by the UI module 350 or generated by the pagination control 430. In response to the pagination command, the client machine 110 or 112 may present the second page of responsive items (operation 1570) and request a third page of responsive items from the application server 118 (operation 1580).

Figure 16:
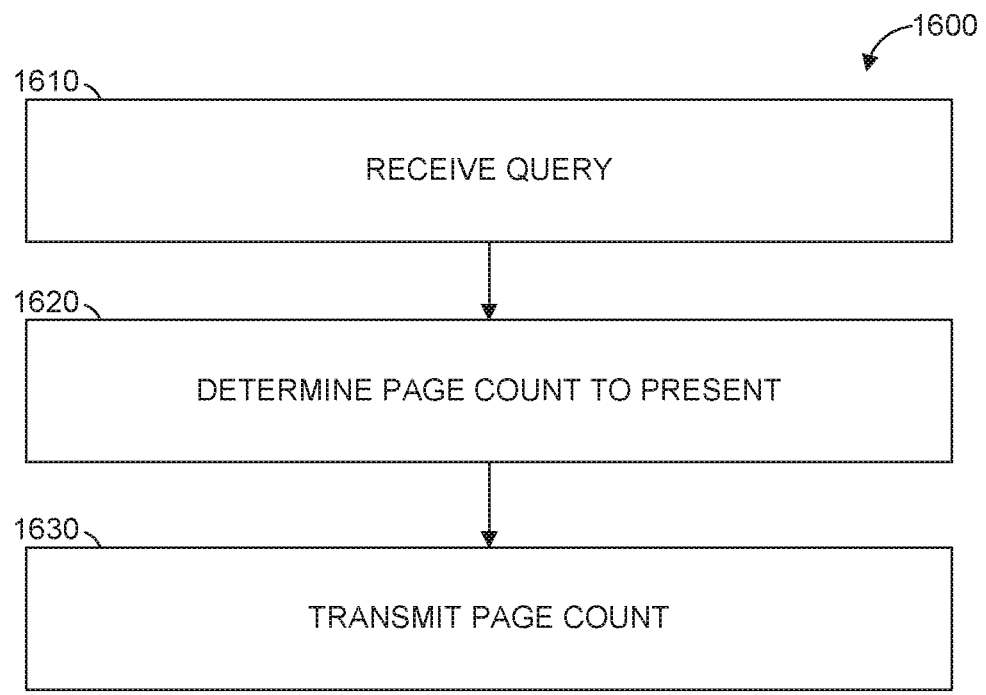
FIG. 16 is a flowchart illustrating operations of an application server, in accordance with an example embodiment, suitable for seamless pagination.

FIG. 16 is a flowchart illustrating operations of an application server 118 in performing a method 1600 of seamless pagination, according to some example embodiments. Operations in the method 1600 may be performed by the search application 121 running on the application server 118, using modules described above with respect to FIG. 2.

The search application 121 may receive a search query (operation 1610), e.g., from the client machine 110 or 112 searching for items for sale. The search application 121 may determine a number of items of results or a number of pages of results to have presented to the user (operation 1620), using any combination of the criteria discussed above with respect to FIG. 2. In response to the search query, the search application 121 may transmit the number of pages to present to the client machine 110 or 112 (operation 1630).

Figure 17:
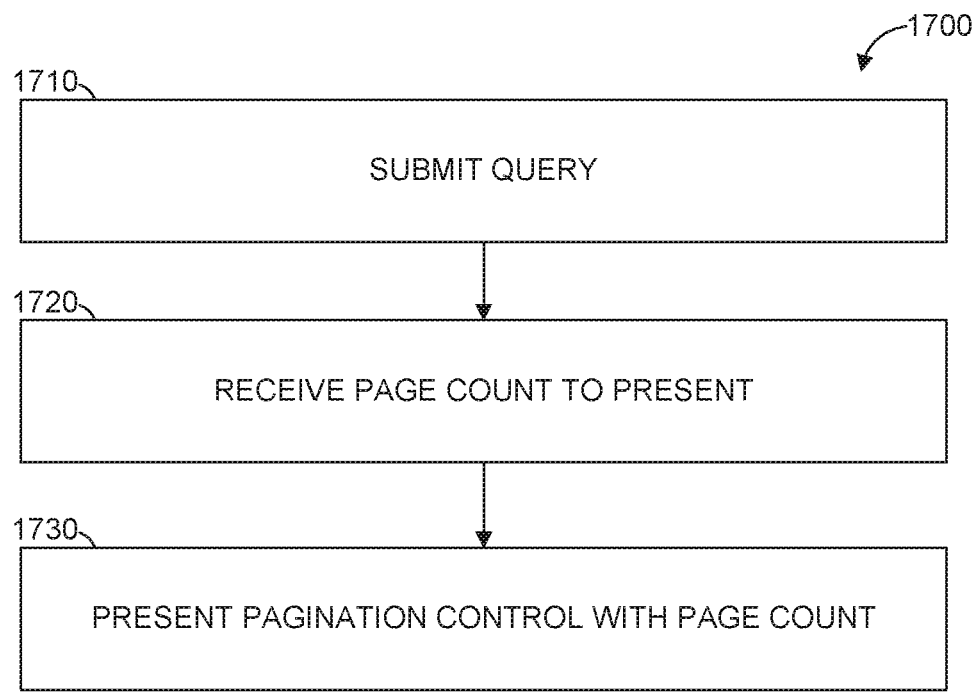
FIG. 17 is a flowchart illustrating operations of a client machine, in accordance with an example embodiment, suitable for seamless pagination.

FIG. 17 is a flowchart illustrating operations of a client machine 110 or 112 in performing a method 1700 of seamless pagination, according to some example embodiments. Operations in the method 1700 may be performed by the client machine 110 or 112, using modules described above with respect to FIG. 3.

The client machine 110 or 112 may transmit a search query (operation 1710). For example, the search query may be received by the UI module 350 or entered into the text entry field 410. The search query may be transmitted to an application server 118 performing the method 1600, described above. In response to the search query, the client machine 110 or 112 may receive a page count of items to present (operation 1720). The client machine 110 or 112 may display a pagination control (operations 1730) operable to select among the first page count of pages of results. For example, if the page count is three, the pagination control may be operable to allow the user to select any of the first three pages.

Figure 18:
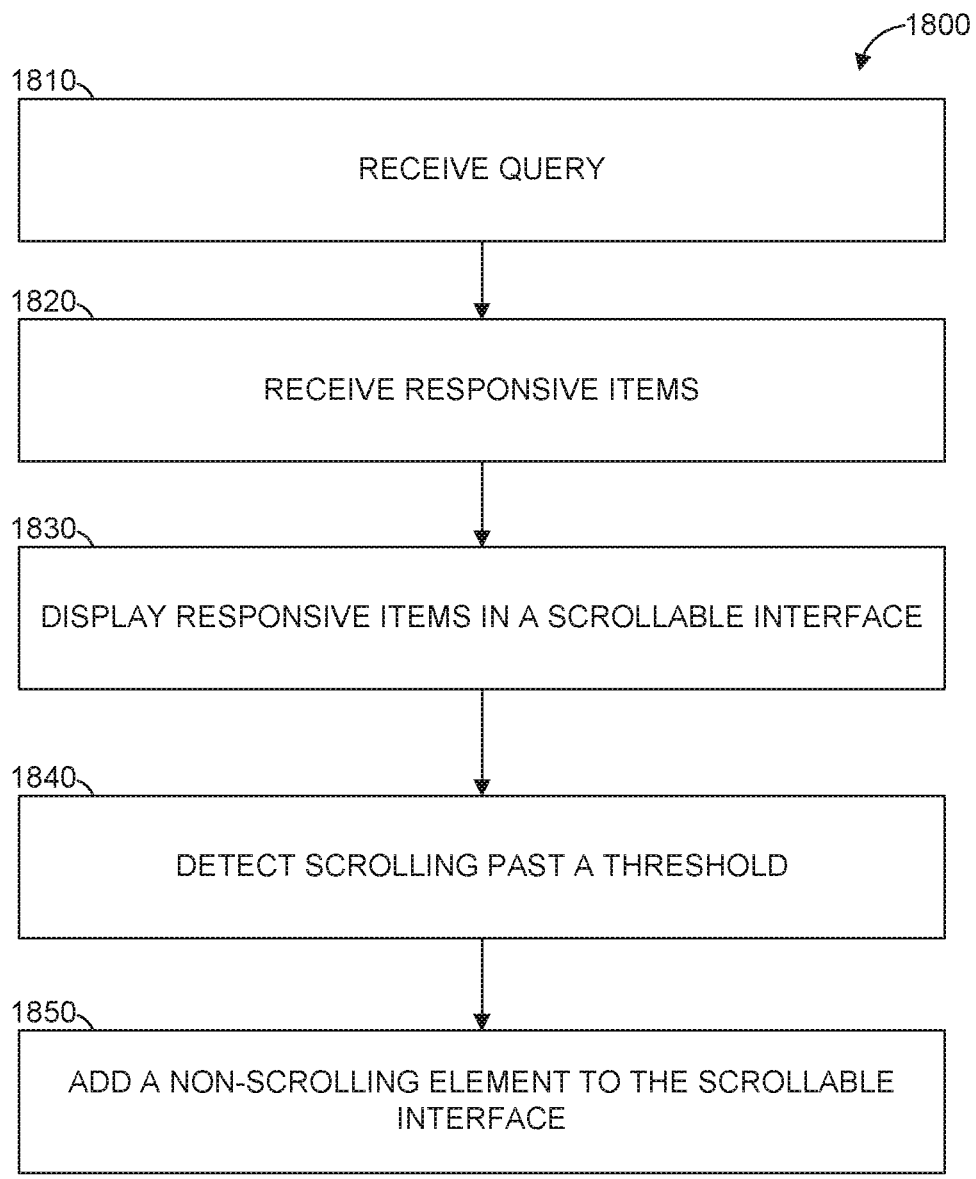
FIG. 18 is a flowchart illustrating operations of a client machine, in accordance with an example embodiment, suitable for seamless pagination.

FIG. 18 is a flowchart illustrating operations of a client machine 110 or 112 in performing a method 1800 of contextual refinement with seamless pagination, according to some example embodiments. Operations in the method 1800 may be performed using modules described above with respect to FIG. 3, in conjunction with the search application 121 running on the application server 118, using modules described above with respect to FIG. 2.

In operation 1810, the client machine 110 or 112 may receive a search query from a user via a UI. For example, a text field and a submit button may be presented to the user. The user may enter a search string into the text field and press the submit button.

In the operation 1820, the client machine 110 or 112 may receive responsive items to the search query. For example, the client machine 110 or 112 may send the search query to the search application 121. The search application 121 may run the query and identify the responsive items. In response to the search query, the search application 121 may transmit all or a subset of the responsive items to the client machine 110 or 112.

In the operation 1830, the client machine 110 or 112 may display the responsive items in a scrollable interface. The responsive items may be sufficient to cover more than one page of screen area.

In the operation 1840, the client machine 110 or 112 may detect that the scrollable interface has been scrolled past a threshold. For example, the UI may include a scroll bar, operable to scroll the UI up and down. The threshold may have been set based on a number of responsive items, a number of pages scrolled, a number of pixels scrolled, or another measure of scrolling. The threshold may be fixed, based on the user's device, based on the user's prior search interactions, or based on the search interactions of other users.

In the operation 1850, the client machine 110 or 112 adds a non-scrollable element to the UI. For example, a non-scrolling refinement option may be presented, operable to refine the user's search. As another example, a non-scrolling element operable to present refinement options may be presented.

Figure 19:
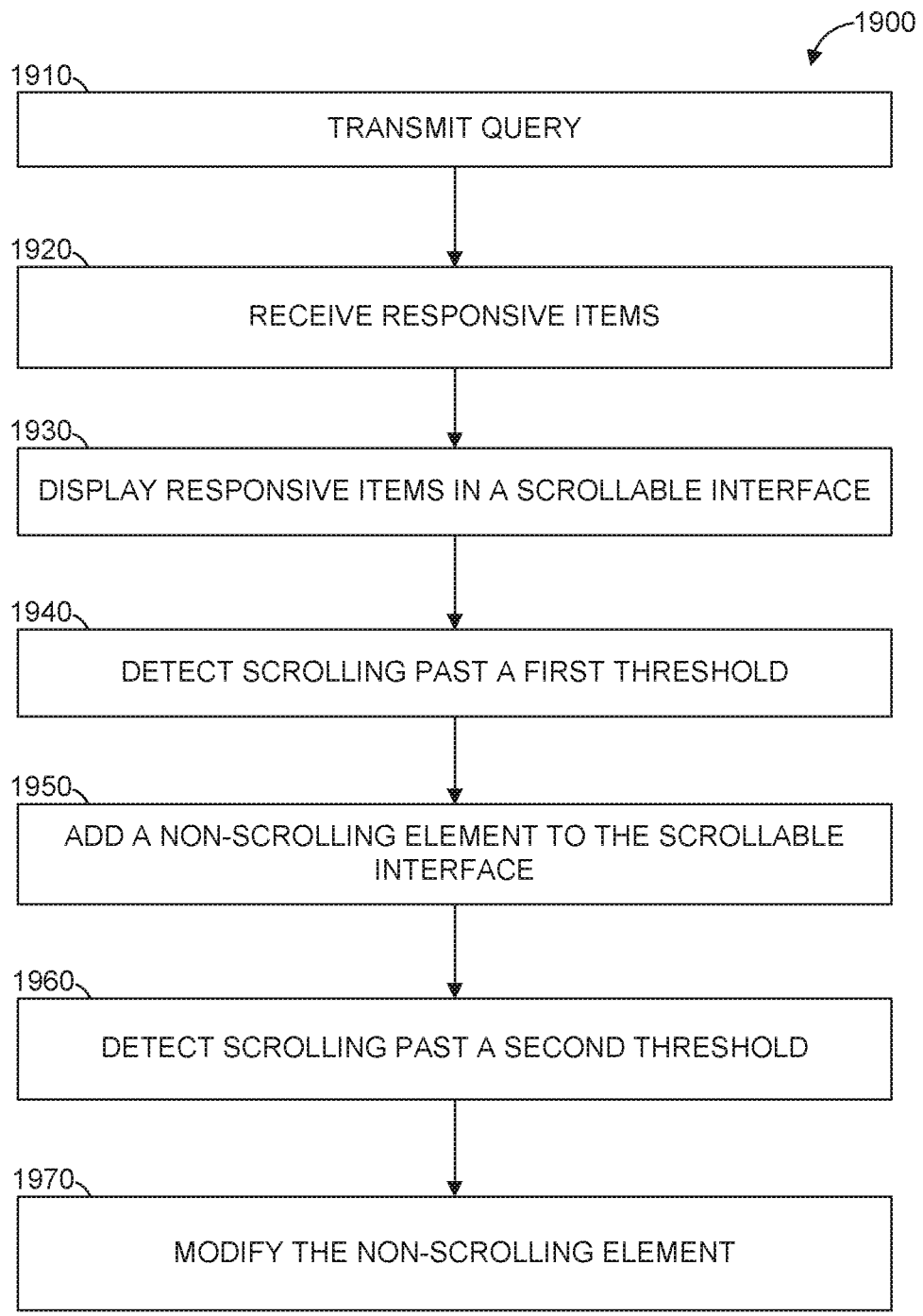
FIG. 19 is a flowchart illustrating operations of a client machine, in accordance with an example embodiment, suitable for seamless pagination.

FIG. 19 is a flowchart illustrating operations of a client machine 110 or 112 in performing a method 1900 of contextual refinement with seamless pagination, according to some example embodiments. Operations in the method 1900 may be performed using modules described above with respect to FIG. 3, in conjunction with the search application 121 running on the application server 118, using modules described above with respect to FIG. 2.

In operation 1910, the client machine 110 or 112 may receive a search query from a user via a UI. For example, a text field and a submit button may be presented to the user. The user may enter a search string into the text field and press the submit button.

In operation 1920, the client machine 110 or 112 may receive responsive items to the search query. For example, the client machine 110 or 112 may send the search query to the search application 121. The search application 121 may run the query and identify the responsive items. In response to the search query, the search application 121 may transmit all or a subset of the responsive items to the client machine 110 or 112.

In operation 1930, the client machine 110 or 112 may display the responsive items in a scrollable interface. The responsive items may be sufficient to cover more than one page of screen area.

In operation 1940, the client machine 110 or 112 may detect that the scrollable interface has been scrolled past a first threshold. For example, the UI may include a scroll bar, operable to scroll the UI up and down. The first threshold may have been set based on a number of responsive items, a number of pages scrolled, a number of pixels scrolled, or another measure of scrolling. The first threshold may be fixed, based on the user's device, based on the user's prior search interactions, or based on the search interactions of other users.

In operation 1950, the client machine 110 or 112 adds a non-scrollable element to the UI. The adding of the non-scrollable element may be based on the detection that the scrollable interface has been scrolled past the first threshold. For example, a non-scrolling refinement option may be presented, operable to refine the user's search. As another example, a non-scrolling element operable to present refinement options may be presented.

In operation 1960, the client machine 110 or 112 may detect that the scrollable interface has been scrolled past a second threshold. For example, the UI may include a scroll bar, operable to scroll the UI up and down. The second threshold may have been set based on a number of responsive items, a number of pages scrolled, a number of pixels scrolled, or another measure of scrolling. The second threshold may be fixed, based on the user's device, based on the user's prior search interactions, or based on the search interactions of other users. The second threshold may be defined as an absolute position (e.g., five screens from the top of the result list) or a relative position (e.g., four screens from the first threshold).

In operation 1970, the client machine 110 or 112 modifies the non-scrollable element added to the UI in operation 1950. The modifying of the non-scrollable element may be based on the detection that the scrollable interface has been scrolled past the second threshold. For example, a non-scrolling element operable to present refinement options may be presented when the scrollable interface is scrolled past the first threshold, and the element modified to actually present the refinement options without further interaction from the user when the scrollable interface is scrolled past the second threshold.

Figure 20:
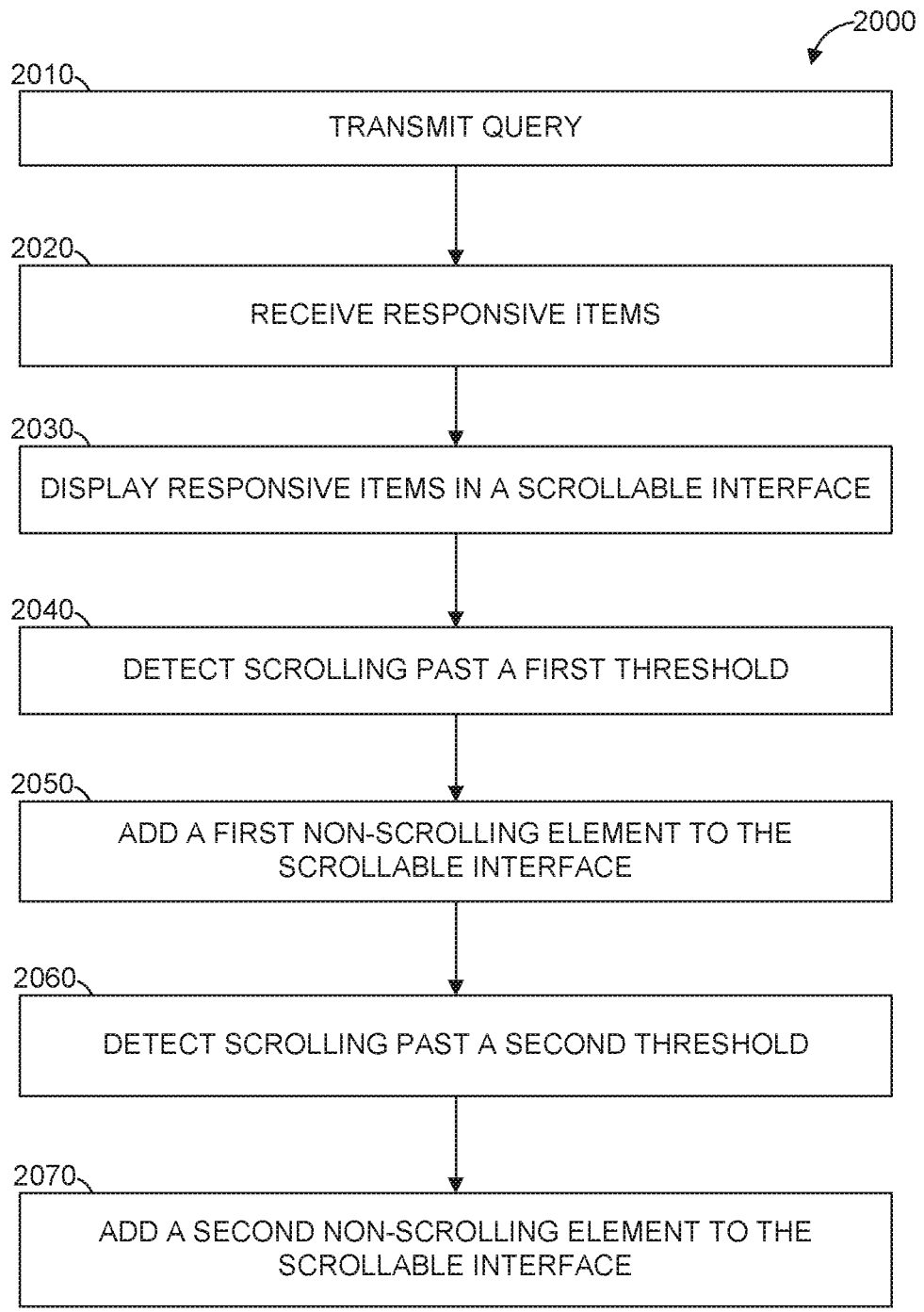
FIG. 20 is a flowchart illustrating operations of a client machine, in accordance with an example embodiment, suitable for seamless pagination.

FIG. 20 is a flowchart illustrating operations of a client machine 110 or 112 in performing a method 2000 of contextual refinement with seamless pagination, according to some example embodiments. Operations in the method 2000 may be performed using modules described above with respect to FIG. 3, in conjunction with the search application 121 running on the application server 118, using modules described above with respect to FIG. 2. The operations 2010-2060 correspond to operations 1910-1960, described above with respect to FIG. 19.

In operation 2070, the client machine 110 or 112 adds a second non-scrollable element to the non-scrollable element added to the UI in operation 2050. For example, the first non-scrollable element may be operable to present refinement options relating to the brand of an item, and the second non-scrollable element may be operable to present refinement options relating to the price of an item.

According to various example embodiments, one or more of the methodologies described herein may facilitate contextual refinement during seamless pagination. Hence, one or more the methodologies described herein may facilitate retrieval and presentation of information requested by a user, while indicating one or more suggested refinements to increase the precision of the user's search.

Figure 21:
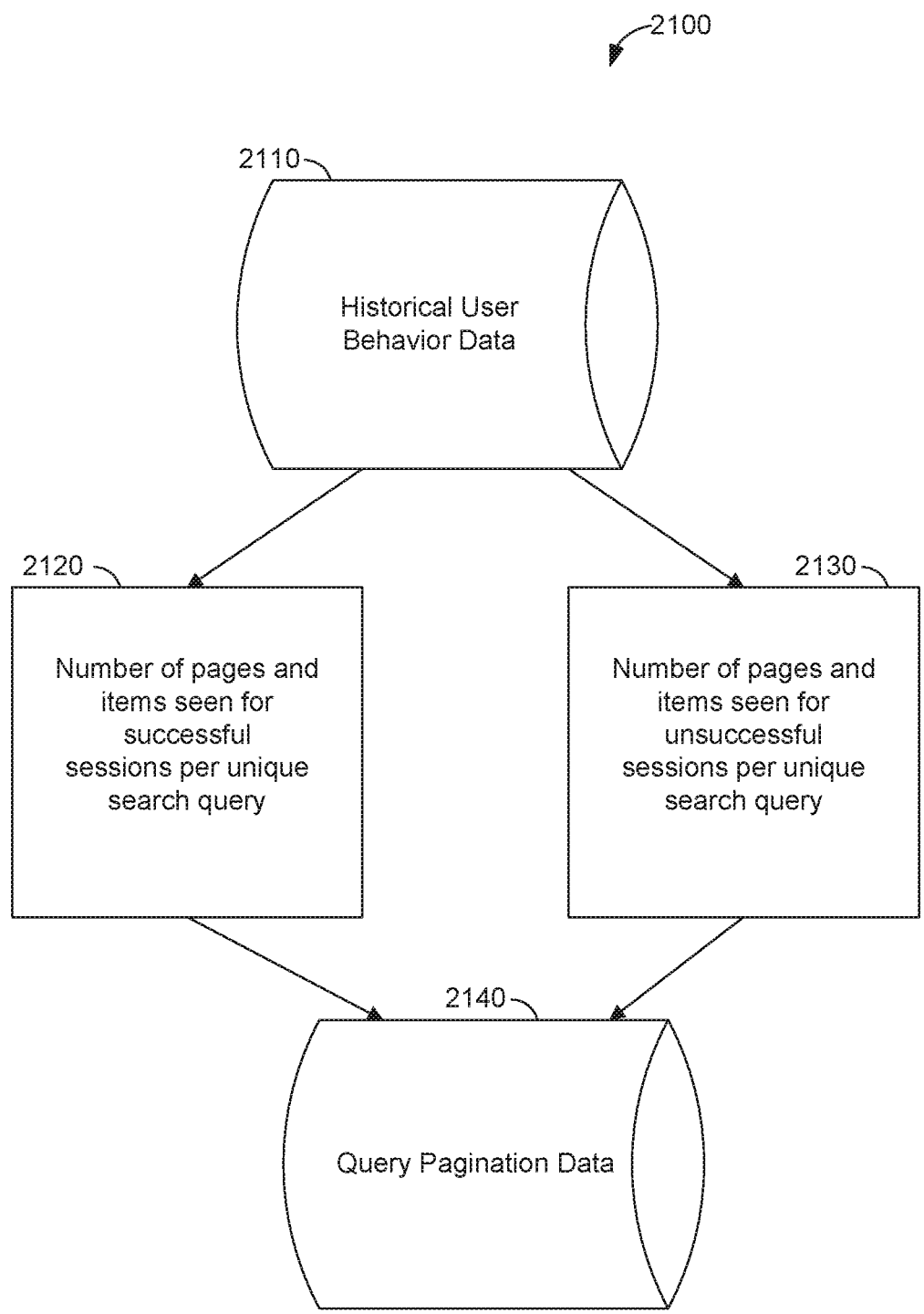
FIG. 21 is a block diagram illustrating the use of query data features, in accordance with an example embodiment, suitable for seamless pagination.

FIG. 21 is a block diagram 2100 illustrating the use of query data features, in accordance with an example embodiment, suitable for seamless pagination. A database 2110 stores historical user behavior data with data regarding the behavior of a number of users of the system. In one embodiment, data regarding the actions of all users are stored in the database 2110. The database 2110 may be mined to determine the number of pages and items seen for successful sessions for a query 2120 as well as the number of pages and items seen for unsuccessful sessions for the query 2130. A successful session may be a session in which a user interacts with an item in any way (e.g., views the item, bids on the item, buys the item, subscribes to the item, etc.) or a session in which a particular interaction is performed (e.g., bids on the item, buys the item, or both). An unsuccessful session may be any session that is not successful. Other criteria may also be used to identify successful and unsuccessful sessions. Based on the number of pages and items seen for successful sessions for a query 2120, the number of pages and items seen for unsuccessful sessions for the query 2130, or both, database 2140 of query pagination data may be created or updated. Based on information in the database 2140, the number of pages to display to a user making the query may be determined. Additionally or alternatively, based on information in the database 2140, the number of pages and items to display to a user making the query before presenting or altering a non-scrollable UI element may be determined.

Figure 22:
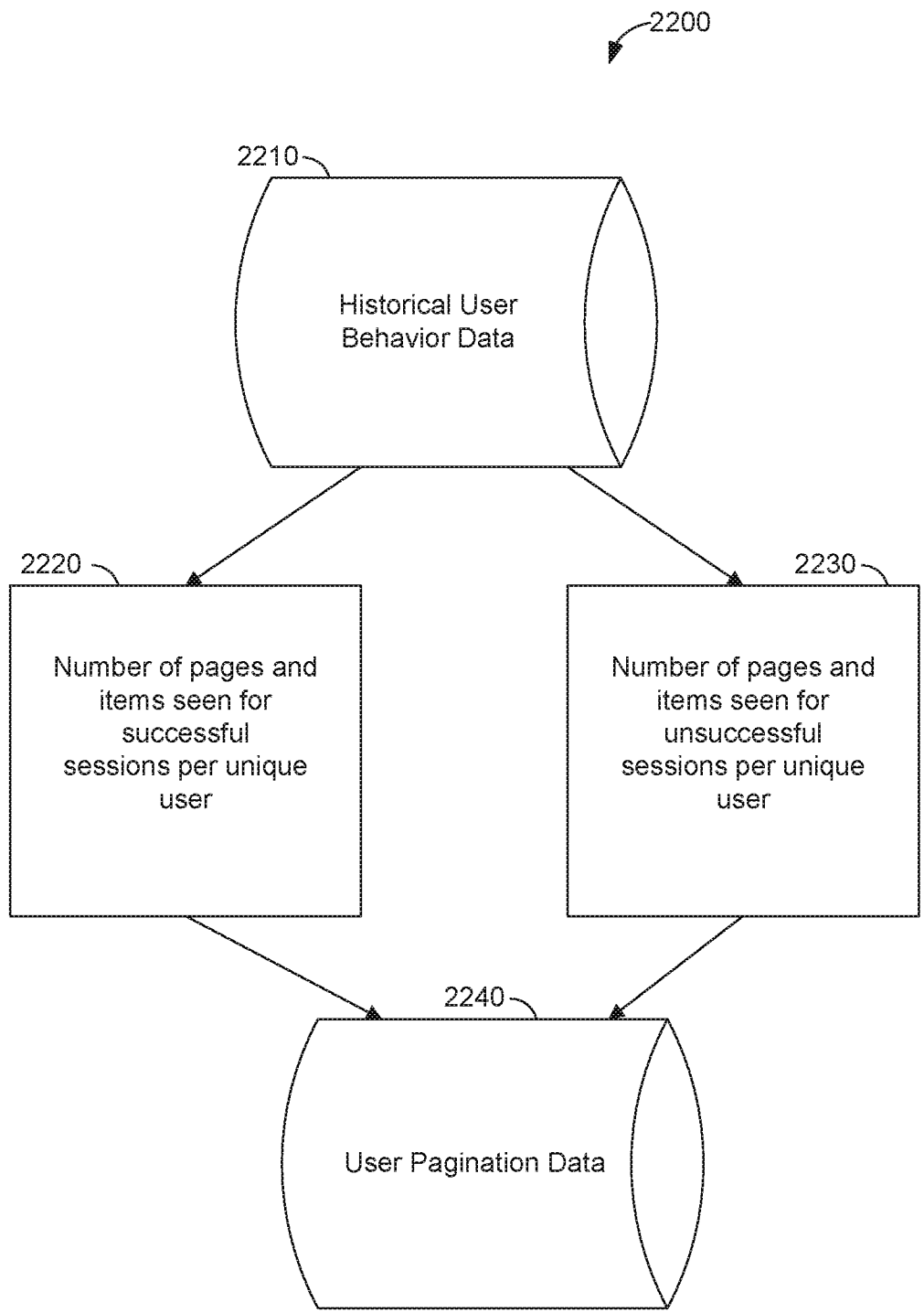
FIG. 22 is a block diagram illustrating the use of user data features, in accordance with an example embodiment, suitable for seamless pagination.

FIG. 22 is a block diagram 2200 illustrating the use of user data features, in accordance with an example embodiment, suitable for seamless pagination. In the block diagram 2200, a database 2210 containing historical user behavior data may be mined to determine the number of pages and items seen for successful sessions for a user 2220 as well as the number of pages and items seen for unsuccessful sessions for the user 2230. Based on the number of pages and items seen for successful sessions for a user 2220, the number of pages and items seen for unsuccessful sessions for the user 2230, or both, database 2240 of user pagination data may be created or updated. Based on information in the database 2240, the number of pages to display to a user making a query may be determined. The historical user behavior data for the user and the query may be combined or used independently. For example, if, based on the user data alone, the number of pages to present is 5, and, based on the query data alone, the number of pages to present is 7, some example embodiments may present 5 pages, while others would present 7, and still others would average the values and present 6.

Figure 23:
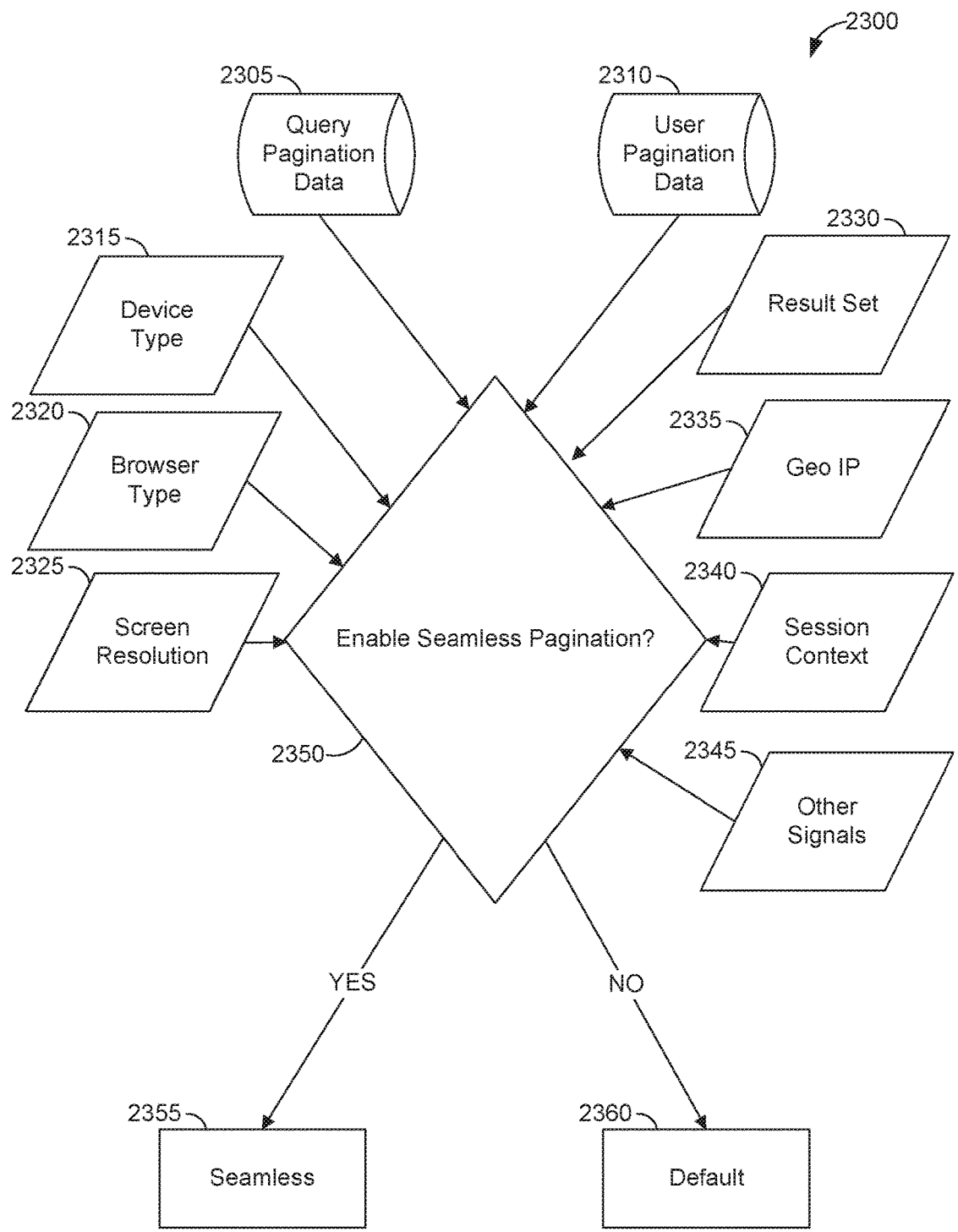
FIG. 23 is a block diagram illustrating factors that may be considered, in accordance with an example embodiment, when deciding whether or not to enable seamless pagination.

FIG. 23 illustrates some of the factors that may be considered in determining whether to enable seamless pagination. The determination to enable seamless pagination may be based on the pagination data for other users for the same query 2305, the pagination data for this user for different queries 2310, the browser type 2320 of the client machine 110, the device type 2315 of the client machine 110 or 112, the screen resolution 2325 of the client machine 110 or 112, the result set 2330, the location 2335 of the client machine 110 or 112, the session context 2340, and other signals 2345. At decision 2350, a decision is made to enable or disable seamless pagination, based on one or more of the input factors. Accordingly, either result 2355, enabling seamless pagination, is reached, or result 2360, using default pagination, is reached. For example, seamless pagination may be disabled for certain queries, based on the previous behavior of other users who have submitted the query. Likewise, seamless pagination may be disabled for certain users, based on the previous behavior of the user after submitting previous queries.

Device type 2315 may be considered. For example, users using full-screen devices (e.g., desktop computers) may tend to scroll through more pages than those using small-screen devices (e.g., mobile devices), so the number of pages to present may be higher for users of full-screen devices. The device factor may also be applied when accessing the previous searches of other users. For example, rather than considering all searches of other users for the same query, only searches from similar devices may be considered. The similarity may be based on the manufacturer of the device (e.g., Apple devices, HP devices, etc.), the class of the device (e.g., phone, tablet, laptop, desktop, etc.), the capabilities of the device (e.g., screen size, screen resolution, touchscreen, memory, processor speed, etc.), the capabilities of the network (e.g., bandwidth between the application server and the client machine, latency between the application server and the client machine, and so on) or other device factors, in any suitable combination.

A related factor may be the speed or other environmental circumstances of the device. For example, a user who gets motion sick frequently may browse differently when travelling in a train than when at rest, and the system can be intelligent enough to modify the pagination based at least partially on the speed of the device. This may be extended to embodiments where the driver of a vehicle is interacting with search results, such as through the head unit of a vehicle. In such instances, user distraction is an important factor, and it may be desirable to err on the side of providing an even more simplified interface (possibly with fewer pages) in such circumstances, to reduce the driver distraction.

Session context data 2340, such as the query or queries run by the user immediately before the current query was submitted, may be considered. For example, the number of pages to present when a user searches for "iPhone 5" may be eight, but when the search immediately follows a search for "phone," the number of pages to present may be 5. Another contextual factor may be the frequency with which the user has run the search query. For example, a user who periodically searches for a collectible item may be indicating a heightened level of interest in the search results, and accordingly additional pages of results may be presented.

Geolocation data 2335, such as the location of the user or the device, may be considered. For example, users in urban areas may tend to scroll through more pages than users in rural areas, and so the number of pages to present may be higher for users in urban areas. The geolocation factor may also be applied when accessing the previous searches of other users. For example, rather than considering all searches of other users for the same query, only searches from the user's area may be considered. The user's area may be defined as a political unit, such as a city, county, state, or the like, or a geographical region encompassing all other users within a certain radius (e.g., five miles, 50 miles, or 200 miles) of the user. In another example embodiment, the area may be classified based on previous user behavior. For example, the user may act differently when browsing from home than when browsing from work. The geolocation of the user's home and work positions may be tracked and this information may be utilized in customizing the pagination based not just on the user, but also on whether the user is at home or at work A temporal factor may also be applied. For example, rather than looking at all historical data for the user or the query, only behavioral data from a particular time period may be used. Different temporal factors may be used for the historical data for the user and the historical data for the query, a temporal factor may be used for one and not the other, or the same temporal factor may be used for both. For example, the user's behavior over the past two weeks may be considered and other users' behavior with the query over the past two months may be considered.

A social factor may also be considered. For example, users of a social network that are friends with users that frequently view more pages of results may prefer to see more pages of results than users that are friends with users that frequently view fewer pages of results. The social factor may also be applied when accessing the previous searches of other users. For example, rather than considering all searches of other users for the same query, only searches from friends may be considered. Other relationships may also be considered, such as friends-of-friends, membership in a particular group, subscription to a particular feed, and so on.

An advertising factor may also be considered. For example, advertisements may be displayed along with the items. Advertisers may pay a per-click, per-impression, or per-sale rate for each advertisement presented. Accordingly, it may be beneficial to encourage users to view more pages of items before choosing an item to interact with, and queries associated with more advertisements or advertisements sold at higher rates may have more pages of results presented than queries with fewer or less profitable advertisements.

Direct monetization may also be considered. For example, an owner of an item that appears on a later page of search results may be interested in paying a fee to encourage enough pages of search results to be presented to include the item. Likewise, an owner of an item that appears on an early page of search results may be interested in paying a fee to reduce the number of pages presented in order to encourage the user to interact with the item. In some example embodiments, this allows the order of the search results to be unaffected by monetization while still allowing monetization of the search results.

In some example embodiments, the average number of items displayed before a user interacts with an item is used to determine the number of pages of results to be displayed, as described above. In other example embodiments, the median number of items displayed before a user interacts with an item is used. Using the median number would mean that 50% of users would prefer additional item views while 50% would prefer fewer. Other percentages may be used as well. For example, the number of pages to be displayed may be based on the maximum number of pages viewed by 95% of users. In each case, the identified number of items or pages may be considered to be the number of items viewed by the average user before interacting with an item.

An example table of interaction percentages is shown below.

| Page Number | Count | Total | As Percentage | Cumulative Percentage |
|---|---|---|---|---|
| 1 | 7619219 | 13620362 | 55.94% | 55.94% |
| 2 | 1398029 | 13620362 | 10.26% | 66.20% |
| 3 | 843538 | 13620362 | 6.19% | 72.39% |
| 4 | 581797 | 13620362 | 4.27% | 76.66% |
| 5 | 439465 | 13620362 | 3.23% | 79.89% |
| 6 | 334678 | 13620362 | 2.46% | 82.35% |
| 7 | 270301 | 13620362 | 1.98% | 84.33% |
| 8 | 220334 | 13620362 | 1.62% | 85.95% |
| 9 | 185165 | 13620362 | 1.36% | 87.31% |
| 10 | 168763 | 13620362 | 1.24% | 88.55% |
| 11 | 134624 | 13620362 | 0.99% | 89.54% |
| 12 | 115914 | 13620362 | 0.85% | 90.39% |
| 13 | 101197 | 13620362 | 0.74% | 91.13% |
| 14 | 92850 | 13620362 | 0.68% | 91.81% |

As can be seen in this example table, 13,620,362 similar searches had been run by users prior to the current query. Of those searches, 55.94% (or 7,619,219 searches) resulted in an interaction with an item on the first page, 10.26% (or 1,398,029 searches) resulted in an interaction with an item on the second page, and so on. Thus, if a 50% threshold is selected, the number of identified pages is one, while if an 85% threshold is selected, the number of identified pages is eight.

According to various example embodiments, one or more of the methodologies described herein may facilitate seamless pagination. Hence, one or more the methodologies described herein may facilitate retrieval and presentation of information requested by a user, while indicating a suggested number of items to consider. Presenting only a limited number of pages in the pagination control may encourage the user to interact with an item without looking at more than the determined number of items, which may result in a better experience for the user, in greater engagement with the search engine or the result set by the user, time saved by the user, and greater sales of items provided to the user by the search engine. Providing a pagination control may also help the user keep track of the current location within the result set, enabling the user to more quickly return to items of interest that have been mentally flagged by the user.

According to various example embodiments, one or more of the methodologies described herein may facilitate contextual refinement during seamless pagination. Hence, one or more the methodologies described herein may facilitate retrieval and presentation of information requested by a user, while indicating one or more suggested refinements to increase the precision of the user's search.

When these effects are considered in aggregate, one or more of the methodologies described herein may obviate a need for certain efforts or resources that otherwise would be involved in searching. Efforts expended by a user in identifying items of interest may be reduced by one or more of the methodologies described herein. Computing resources used by one or more machines, databases, or devices (e.g., within the client-server system 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 24:
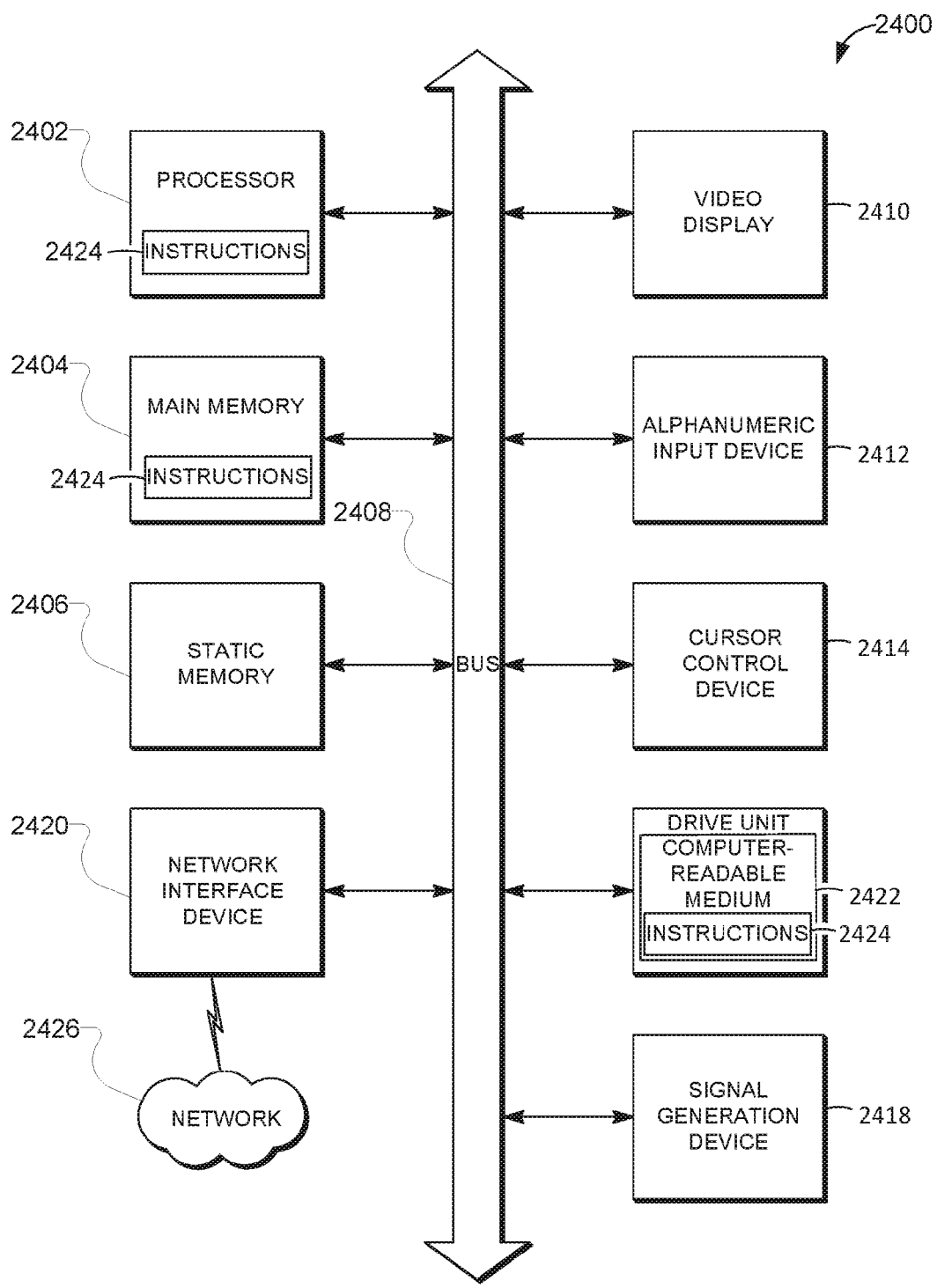
FIG. 24 is a block diagram illustrating components of a machine, according to some example embodiments, able to read instructions from a machine-readable medium and perform any one or more of the methodologies discussed herein.

FIG. 24 is a block diagram of machine in the example form of a computer system 2400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2400 includes a processor 2402 (e.g., a central processing unit (CPU), a graphics processing unit (GPU), or both), a main memory 2404 and a static memory 2406, which communicate with each other via a bus 2408. The computer system 2400 may further include a video display unit 2410 (e.g., a liquid crystal display (LCD) or a cathode ray tube (CRT)). The computer system 2400 also includes an alphanumeric input device 2412 (e.g., a keyboard or a touch-sensitive display screen), a cursor control device 2414 (e.g., a mouse), a disk drive unit 2416, a signal generation device 2418 (e.g., a speaker) and a network interface device 2420.

Machine-Readable Medium

The disk drive unit 2416 includes a machine-readable medium 2422 on which is stored one or more sets of instructions and data structures (e.g., software) 2424 embodying or utilized by any one or more of the methodologies or functions described herein. The instructions 2424 may also reside, completely or at least partially, within the main memory 2404 and/or within the processor 2402 during execution thereof by the computer system 2400, with the main memory 2404 and the processor 2402 also constituting machine-readable media.

While the machine-readable medium 2422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2424 may further be transmitted or received over a communications network 2426 using a transmission medium. The instructions 2424 may be transmitted using the network interface device 2420 and any one of a number of well-known transfer protocols (e.g., HTTP). Examples of communication networks include a local area network (LAN), a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A device, comprising:
a display;
a memory storing computer-executable instructions; and
one or more processors configured to execute the computer-executable instructions to cause the device to perform operations comprising:
subsequent to transmitting a search query of a user to a server, receiving a plurality of search results from the server, the plurality of search results corresponding to a first quantity of pages;
displaying, on a first area of a user interface presented on the display, at least one page of the first quantity of pages;
in response to determining that the user has caused the user interface to scroll through a threshold amount of the at least one page in which individual positions of respective search results of the plurality of search results move in the user interface in response to the scrolling through the at least one page, displaying, on a second area of the user interface, a set of non-scrollable search refinement elements corresponding to the plurality of search results; and
subsequent to receiving a selection of one or more of the set of non-scrollable search refinement elements, adjusting the plurality of search results.

2. The device of claim 1, wherein the operations further comprise:
determining the set of non-scrollable search refinement elements based on other user interactions with prior search results corresponding to prior search queries similar to the transmitted search query.

3. The device of claim 1, wherein the operations further comprise:
determining the set of non-scrollable search refinement elements based on prior interactions of the user with search results from prior search queries conducted by the user.

4. The device of claim 3, wherein the prior interactions are selected from a group consisting of: shopping sessions, item purchases, performing a subsequent different search, and browsing sessions.

5. The device of claim 1, wherein the operations further comprise:
in response to determining that the user has scrolled down a second threshold amount of the at least one page, adjusting the display of the set of non-scrollable search refinement elements.

6. The device of claim 4, wherein the adjusting the display of the set of non-scrollable search refinement elements comprises:
removing the set of non-scrollable search refinement elements from the second area of the display; and
displaying a second set of non-scrollable search refinement elements in the second area of the display.

7. The device of claim 4, wherein the adjusting the display of the set of non-scrollable search refinement elements comprises:
displaying a second set of non-scrollable search refinement elements in a third area of the display.

8. The device of claim 1, wherein the operations further comprise:
prefetching the at least one page based on prefetch criteria prior to the displaying the at least one page in the first area of the display.

9. The device of claim 8, wherein the prefetch criteria is selected from a group consisting of a pagination mode, an amount of available memory, a scrolling rate corresponding to the user, and one or more scrolling rates of other users.

10. A method, comprising:
receiving, by a machine, a plurality of search results corresponding to a query of a user;
displaying, on a first area of an electronic page, a portion of the plurality of search results;
in response to determining that a threshold amount of the electronic page has been navigated in which individual positions of respective search results of the portion of the plurality of search results move in the first area in response to the navigating, displaying, on a second area of the electronic page, a set of non-scrollable search refinement elements corresponding to the plurality of search results; and
in response to receiving a selection of one or more of the set of non-scrollable search refinement elements, adjusting the portion of the plurality of search result.

11. The method of claim 10, wherein the displaying the set of non-scrollable search refinement elements is further in response to determining enablement of a non-scrollable refinement option corresponding to one or more option criteria, the one or more option criteria selected from a group of criteria consisting of scrolling data corresponding to the user, scrolling data corresponding to other users, a browser type stored on a user device of the user, a device type corresponding to the user device, a screen resolution corresponding to the display, the plurality of search results, and location data corresponding to the user device.

12. The method of claim 10, further comprising in response to determining navigation through a second threshold amount of the electronic page, adjusting the set of non-scrollable search refinement elements displayed on the second area of the electronic page.

13. The method of claim 12, wherein the adjusting the set of non-scrollable search refinement elements comprises:
removing the set of non-scrollable search refinement elements from the second area of the electronic page; and
displaying a second set of non-scrollable search refinement elements in the second area of the electronic page.

14. The method of claim 12, wherein the adjusting the set of non-scrollable search refinement elements comprises:

displaying a second set of non-scrollable search refinement elements in a third area of the electronic page.

15. The method of claim 10, further comprising prefetching the electronic page based on prefetch criteria prior to the displaying the portion of the plurality of search results in the first area of the display.

16. The method of claim 15, wherein the prefetch criteria is selected from a group of criteria consisting of a pagination mode, an amount of available memory, a scrolling rate corresponding to the user, and one or more scrolling rates of other users.

17. A non-transitory machine-readable storage medium comprising instructions that, in response to being executed by one or more processors of a machine, cause the machine to perform operations comprising:
- displaying, on a first area of a user interface, a subset of a plurality of search results corresponding to a search query;
- determining that the user interface has scrolled past a threshold amount of the subset of the plurality of search results based on an amount of at least one page of the subset of the plurality of search results the user interface has scrolled through in which individual positions of respective search results of the plurality of search results move in the user interface in response to the scrolling through the at least one page;
- in response to determining that the user interface has scrolled past the threshold amount of the subset of the plurality of search results, displaying, on a second area of the user interface, a set of non-scrollable search refinement elements corresponding to the plurality of search results; and
- subsequent to receiving a selection of one or more of the set of non-scrollable search refinement elements, adjusting the plurality of search results.

18. The non-transitory machine-readable storage medium of claim 17, wherein the operations further comprise:
- in response to determining that the user interface has scrolled past a second threshold amount of the subset of the plurality of search results, adjusting the display of the set of non-scrollable search refinement elements.

19. The non-transitory machine-readable storage medium of claim 18, wherein the adjusting the display of the set of non-scrollable search refinement elements comprises:
- removing the set of non-scrollable search refinement elements from the second area of the user interface; and
- displaying a second set of non-scrollable search refinement elements in the second area of the user interface.

20. The non-transitory machine-readable storage medium of claim 18, wherein the adjusting the display of the set of non-scrollable search refinement elements comprises:
- displaying a second set of non-scrollable search refinement elements in a third area of the user interface.

* * * * *